United States Patent
Miyata et al.

(10) Patent No.: US 12,505,371 B2
(45) Date of Patent: Dec. 23, 2025

(54) QUANTUM DEVICE AND QUANTUM COMPUTER

(71) Applicant: NEC Corporation, Tokyo (JP)

(72) Inventors: Akira Miyata, Tokyo (JP); Katsumi Kikuchi, Tokyo (JP); Suguru Watanabe, Tokyo (JP); Takanori Nishi, Tokyo (JP); Hideyuki Satou, Tokyo (JP); Tomohiro Yamaji, Tokyo (JP); Tsuyoshi Yamamoto, Tokyo (JP); Yoshihito Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 600 days.

(21) Appl. No.: 18/007,769

(22) PCT Filed: Jun. 5, 2020

(86) PCT No.: PCT/JP2020/022439
§ 371 (c)(1),
(2) Date: Dec. 2, 2022

(87) PCT Pub. No.: WO2021/245949
PCT Pub. Date: Dec. 9, 2021

(65) Prior Publication Data
US 2023/0237362 A1  Jul. 27, 2023

(51) Int. Cl.
*G06N 10/40* (2022.01)
*G01R 33/035* (2006.01)

(52) U.S. Cl.
CPC ......... *G06N 10/40* (2022.01); *G01R 33/0354* (2013.01)

(58) Field of Classification Search
CPC .... G06N 10/40; G06N 10/00; G01R 33/0354; H10N 69/00
See application file for complete search history.

(56) References Cited

U.S. PATENT DOCUMENTS 9,836,699 B1 * 12/2017 Rigetti ................ H10N 60/815
9,971,970 B1 *  5/2018 Rigetti ............. H01L 21/76898
(Continued)

FOREIGN PATENT DOCUMENTS

JP    2003-197675 A     7/2003
JP    2004-282124 A    10/2004
(Continued)

OTHER PUBLICATIONS

International Search Report for PCT Application No. PCT/JP2020/022439, mailed on Aug. 25, 2020.
(Continued)

*Primary Examiner* — Nha T Nguyen
(74) *Attorney, Agent, or Firm* — Sughrue Mion, PLLC

(57) ABSTRACT

Provided is a quantum device capable of suppressing reduction in performance of quantum bit even when a quantum chip is flip-chip mounted on an interposer. A quantum chip (10) is flip-chip mounted on an interposer (20) by a bump (30). A coplanar line (12) coupling adjacent quantum bits is formed on the quantum chip (10). A gap (22) is provided, in the interposer (20), at a location facing a center conductor (12a) of the coplanar line (12). A second ground electrode (24) is formed around gap (22). The interposer (20) has a connection electrode (40) connecting the second ground electrode (24) around the gap (22). A bump (30A) formed in the vicinity of the connection electrode (40) is connected to the first ground electrode (12b) and the second ground electrode (24).

15 Claims, 19 Drawing Sheets

(56) References Cited

U.S. PATENT DOCUMENTS

| | | | |
|---|---|---|---|
| 10,720,563 B1* | 7/2020 | Jeffrey | G06F 30/30 |
| 2016/0364653 A1* | 12/2016 | Chow | G06N 10/40 |
| 2018/0322408 A1 | 11/2018 | Chen et al. | |
| 2019/0043919 A1* | 2/2019 | George | G06N 10/40 |
| 2019/0044047 A1 | 2/2019 | Elsherbini et al. | |
| 2019/0165241 A1* | 5/2019 | Rosenblatt | H01L 25/0657 |
| 2020/0012961 A1* | 1/2020 | Kelly | G06N 10/40 |
| 2020/0091867 A1 | 3/2020 | Goto et al. | |
| 2020/0176409 A1* | 6/2020 | Lucero | H01L 24/16 |
| 2020/0220064 A1* | 7/2020 | Graninger | H10N 60/12 |
| 2020/0259064 A1* | 8/2020 | Lewandowski | H01L 24/13 |
| 2020/0265334 A1* | 8/2020 | Haider | G06N 10/40 |
| 2020/0328187 A1* | 10/2020 | Cho | H01L 23/5385 |
| 2020/0335686 A1* | 10/2020 | Shao | H10N 60/01 |
| 2020/0394546 A1* | 12/2020 | Bronn | H04L 1/0042 |
| 2020/0395405 A1* | 12/2020 | Barends | H10N 69/00 |
| 2020/0401921 A1* | 12/2020 | Chow | G06N 10/40 |
| 2021/0167271 A1* | 6/2021 | Hidaka | H01L 25/07 |
| 2021/0305165 A1* | 9/2021 | Shao | H01L 23/49816 |

FOREIGN PATENT DOCUMENTS

| | | |
|---|---|---|
| JP | 2018-524795 A | 8/2018 |
| JP | 2019-212755 A | 12/2019 |
| JP | 2020-047999 A | 3/2020 |
| JP | 2020-061554 A | 4/2020 |
| WO | 2018/212041 A1 | 11/2018 |

OTHER PUBLICATIONS

JP Office Action for Japanese Patent Application No. 2023-088744, mailed on Jun. 18, 2024 with English Translation.

* cited by examiner

QUANTUM DEVICE AND QUANTUM COMPUTER

This application is a National Stage Entry of PCT/JP2020/022439 filed on Jun. 5, 2020, the contents of all of which are incorporated herein by reference, in their entirety.

TECHNICAL FIELD

The present invention relates to a quantum device and a quantum computer.

BACKGROUND ART

Patent Literature 1 discloses an electronic circuit, an oscillator including the electronic circuit and a magnetic field application unit, and a calculation device (quantum computer) including the oscillator and a coupler. In addition, Patent Literature 2 discloses a quantum bit device including an elongated thin film, a superconducting quantum interference device (SQUID), and a ground plane. The SQUID is in electrical contact with a proximal end of the elongated thin film and has fewer than three Josephson junctions. The ground plane is coplanar with the elongated thin film and is in electrical contact with a distal end of the elongated thin film.

CITATION LIST

Patent Literature

Patent Literature 1: Japanese Unexamined Patent Application Publication No. 2020-047999
Patent Literature 2: Published Japanese Translation of PCT International Publication for Patent Application, No. 2018-524795

SUMMARY OF INVENTION

Technical Problem

It is known to form an air bridge on a device to suppress (i.e., reduce or prevent) a slot line mode, which is an undesirable transmission operation from a coplanar line, by keeping a ground plane at the same voltage. In Patent Literature 2, a crossover air bridge is manufactured on a device in order to support suppression of an undesirable slot line mode or the like from a waveguide. Meanwhile, in order to reduce complexity of wiring for transmitting and receiving a large number of microwave signals and to save an arrangement space, a quantum chip constituting a quantum bit (resonator) may be flip-chip mounted on an interposer using a bump. Here, in a case where a quantum chip provided with an air bridge described in Patent Literature 2 is flip-chip mounted (flip-chip connected) on an interposer, the air bridge may be deformed or destroyed due to a process accompanying the flip-chip mounting. Therefore, since it is difficult to maintain the ground plane at the same voltage using the air bridge, an energy leakage mode such as the slot line mode is not sufficiently suppressed, and performance of the quantum bit may be deteriorated.

An object of the present disclosure is to solve such a problem, and it is an object of the present disclosure to provide a quantum device and a quantum computer capable of suppressing degradation of performance of a quantum bit even when the quantum chip is flip-chip mounted on an interposer.

Solution to Problem

According to an aspect of the present disclosure, there is provided a quantum device including: a quantum chip constituting a quantum bit; and an interposer facing the quantum chip and having a conductor formed on at least a surface facing the quantum chip, in which the quantum chip is flip-chip mounted on the interposer by a bump, a coplanar line for coupling adjacent quantum bits is formed in the quantum chip, and the coplanar line includes a center conductor and a first ground electrode around the center conductor, in a surface of the interposer facing the quantum chip, the conductor is not partially formed along a path of the coplanar line at a location facing the center conductor of the coplanar line, and a second ground electrode is formed around a gap in which the conductor is not formed, the interposer includes a connection electrode configured to connect the second ground electrode around the gap, and the bump formed in the vicinity of the connection electrode is connected to the first ground electrode and the second ground electrode.

According to another aspect of the present disclosure, there is provided a quantum device including: a quantum chip constituting a quantum bit; and an interposer provided to face the quantum chip, in which the quantum chip is flip-chip mounted on the interposer by a bump, a coplanar line for coupling adjacent quantum bits is formed in the quantum chip, and the coplanar line includes a center conductor and a first ground electrode around the center conductor, a second ground electrode is formed in the interposer in a region facing the first ground electrode, the interposer includes a connection electrode connected to the second ground electrode, the bump formed in the vicinity of the connection electrode is connected to the first ground electrode and the second ground electrode, and at least a part of the connection electrode faces the center conductor via a space.

According to still another aspect of the present disclosure, there is provided a quantum computer including: a plurality of the quantum devices; and at least one coupling circuit configured to couple the plurality of quantum bits configured by the plurality of quantum devices and including a coupler configured by the center conductor.

Advantageous Effects of Invention

According to the present disclosure, it is possible to provide a quantum device and a quantum computer capable of suppressing degradation of performance of a quantum bit even when the quantum chip is flip-chip mounted on an interposer.

EXAMPLE EMBODIMENT (Outline of Example Embodiments According to Present Disclosure)

Figure 1:
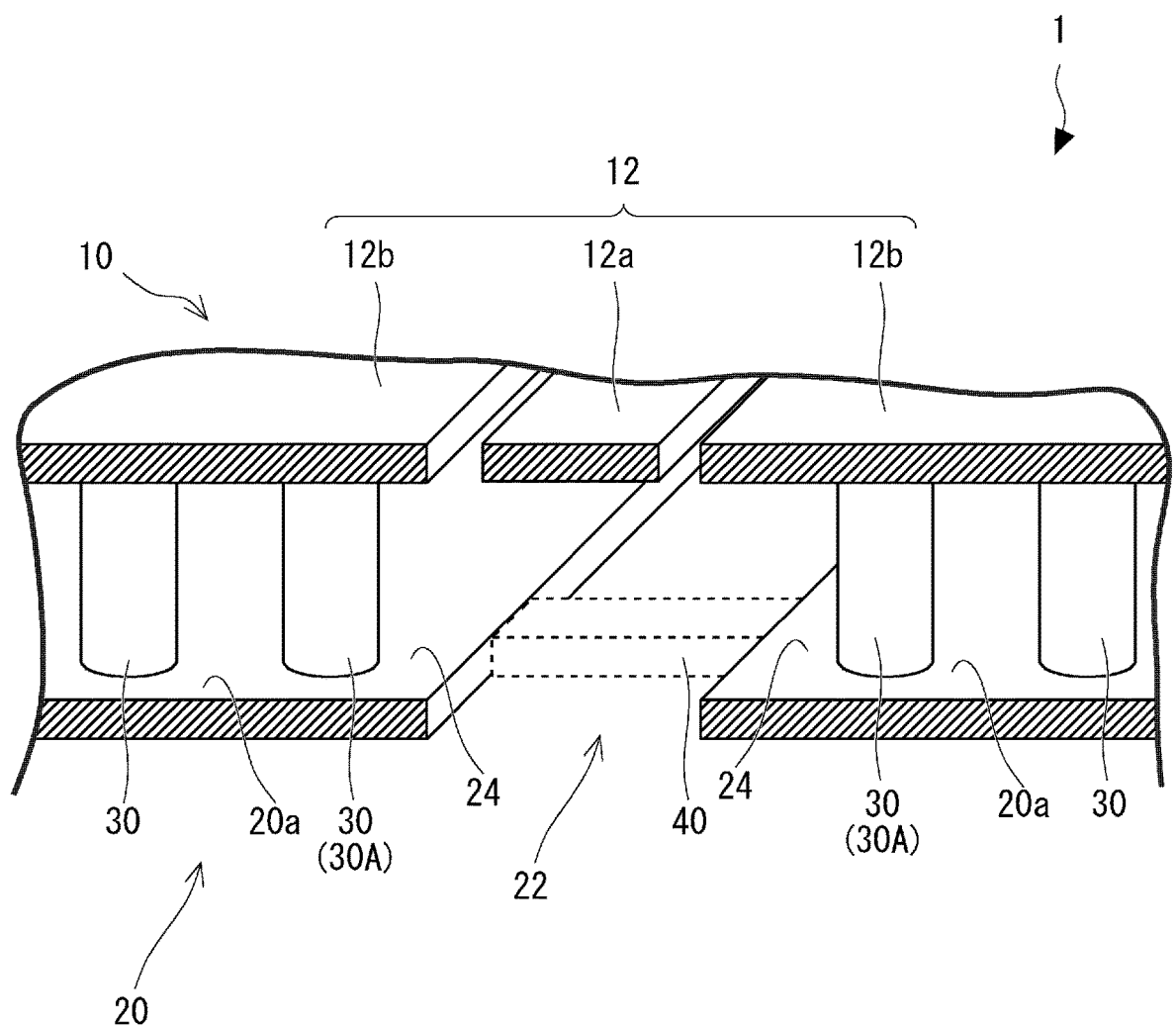
FIG. 1 is a view illustrating an outline of a quantum device according to the present example embodiment.

Prior to describing example embodiments of the present disclosure, an overview of example embodiments according to the present disclosure will be described. FIG. 1 is a view illustrating an outline of a quantum device 1 according to the present example embodiment.

The quantum device 1 includes a quantum chip 10 constituting a quantum bit (quantum bit circuit, oscillator) and an interposer 20 facing the quantum chip 10. A conductor is formed on at least a surface 20a of the interposer 20 facing the quantum chip 10. The conductor may be a superconducting material or a normal conducting (i.e., non-superconducting) material. In addition, the conductor may include a ground electrode, a wire, a pad, or the like. The quantum chip 10 is flip-chip mounted on the interposer 20 by bumps 30. Note that, for example, the quantum device 1 is a device corresponding to one bit of a quantum bit. Then, a plurality of the quantum devices 1 or the quantum chips 10 is arranged to constitute a quantum computer.

In the quantum chip 10, a coplanar line 12 that couples adjacent quantum bits is formed. Here, the coplanar line 12 includes a center conductor 12a and first ground electrodes 12b around (on both sides of) the center conductor 12a. Further, in the interposer 20, a gap 22 is provided at a location facing the center conductor 12a of the coplanar line 12. That is, on the surface of the interposer 20 facing the quantum chip 10, the conductor is not partially formed along a path of the coplanar line 12 at the location facing the center conductor 12a of the coplanar line 12. A dielectric may be exposed in the gap 22 where the conductor is not formed. Second ground electrodes 24 are formed around (on both sides of) the gap 22 of the interposer 20. That is, the second ground electrodes 24 are formed around a location where the conductor is not formed. That is, the conductor formed on the surface 20a of the interposer 20 has the second ground electrode 24 in a region facing the first ground electrodes 12b.

The interposer 20 also has a connection electrode 40 that connects the second ground electrodes 24 around the gap 22. That is, both ends of the connection electrode 40 are connected to the second ground electrodes 24. For example, a bridge-like connection electrode 40 (bridge electrode) partially connecting the second ground electrodes 24 around the gap 22 is formed in a part of the gap 22. For example, the connection electrode 40 may be provided in a part of the gap 22, which is a region where the dielectric is exposed. That is, at the location where the conductor is not formed, the connection electrode 40 for connecting the second ground electrodes 24 around the location is formed. In other words, at least a part of the connection electrode 40 is provided at a position overlapping a part of the region facing the center conductor 12a. Although the connection electrode 40 is linearly formed in FIG. 1, the connection electrode 40 is not limited to such a shape. Bumps 30A formed in the vicinity of the connection electrode 40 are connected to the first ground electrodes 12b and the second ground electrodes 24. At least a part of the connection electrode 40 faces the center conductor 12a via a space.

As a result, potentials of the two ground electrodes (first ground electrodes 12b) constituting the coplanar line 12 in the quantum chip 10 can be the same potential. Therefore, an energy leakage mode such as a slot line mode is suppressed in the coplanar line 12 of the quantum chip 10. Therefore, unnecessary interference between the quantum bits is reduced, and coherence of the quantum bits is improved. Therefore, it is possible to suppress deterioration in performance of quantum bit.

Specifically, in a processing process of flip-chip mounting, film formation and cleaning may be performed on surfaces of the quantum chip and the interposer on which the bumps are formed or surfaces to which the bumps are joined. For this reason, when a quantum chip provided with an air bridge in advance is mounted on the interposer, film formation and cleaning that do not affect the air bridge are required, and thus the technical difficulty is high. That is, these processes such as the film formation and cleaning may deform or destroy an electrode structure of the air bridge formed on the quantum. Therefore, even when the quantum chip is flip-chip mounted on the interposer, the ground plane cannot be maintained at the same voltage using the air bridge. As a result, the energy leakage mode such as the slot line mode is not sufficiently suppressed, and the performance of the quantum bit may be deteriorated.

On the other hand, in the quantum device 1 according to the present disclosure, since the function similar to the air bridge can be realized by the connection electrode 40 as described above, it is possible to achieve both the function similar to the air bridge and the process such as the film formation and cleaning on the surface on/to which the bump is formed or joined. Therefore, in the quantum device 1 according to the present disclosure, even when flip-chip mounting is performed, it is possible to suppress deterioration in the performance of the quantum bit.

First Example Embodiment

Hereinafter, example embodiments will be described with reference to the drawings. For clarity of description, in the following description and figures, omission and simplification are made as appropriate. In the figures, the same elements (i.e., components/structures) are denoted by the same reference numerals, and redundant description is omitted as necessary.

Figure 2:
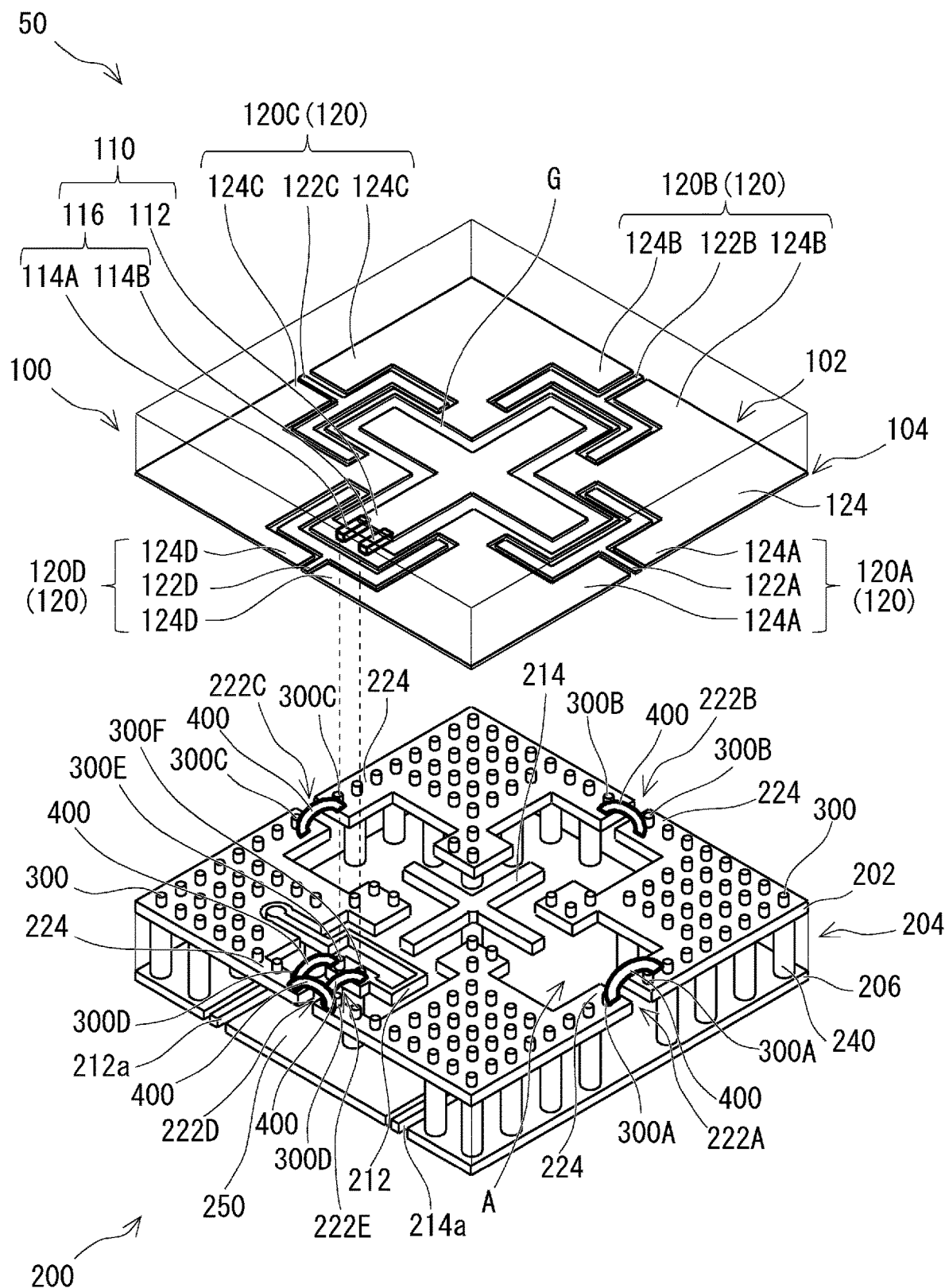
FIG. 2 is a view illustrating a configuration of a quantum device according to a first example embodiment.
Figure 3:
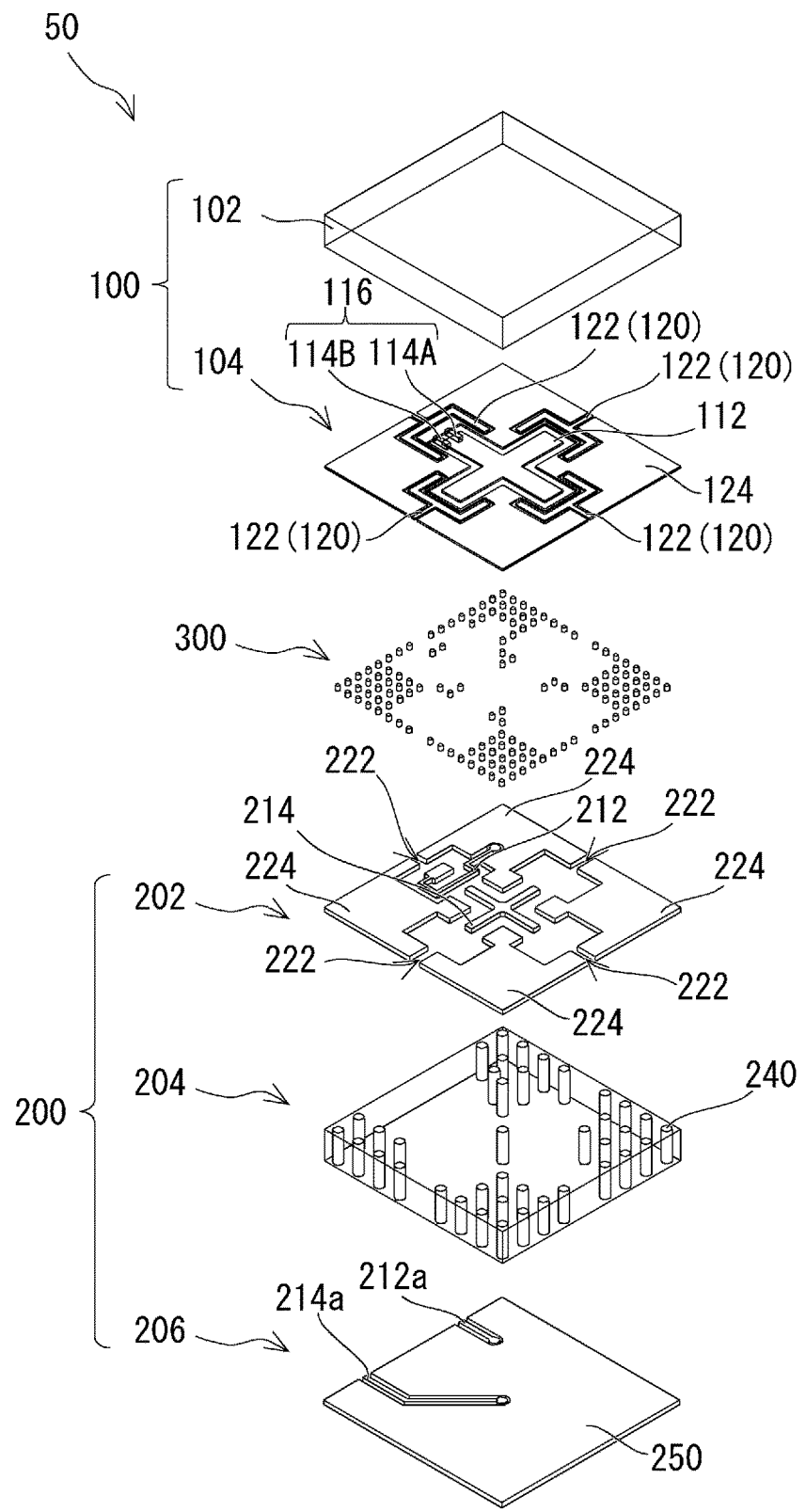
FIG. 3 is a view illustrating the configuration of the quantum device according to the first example embodiment.
Figure 4:
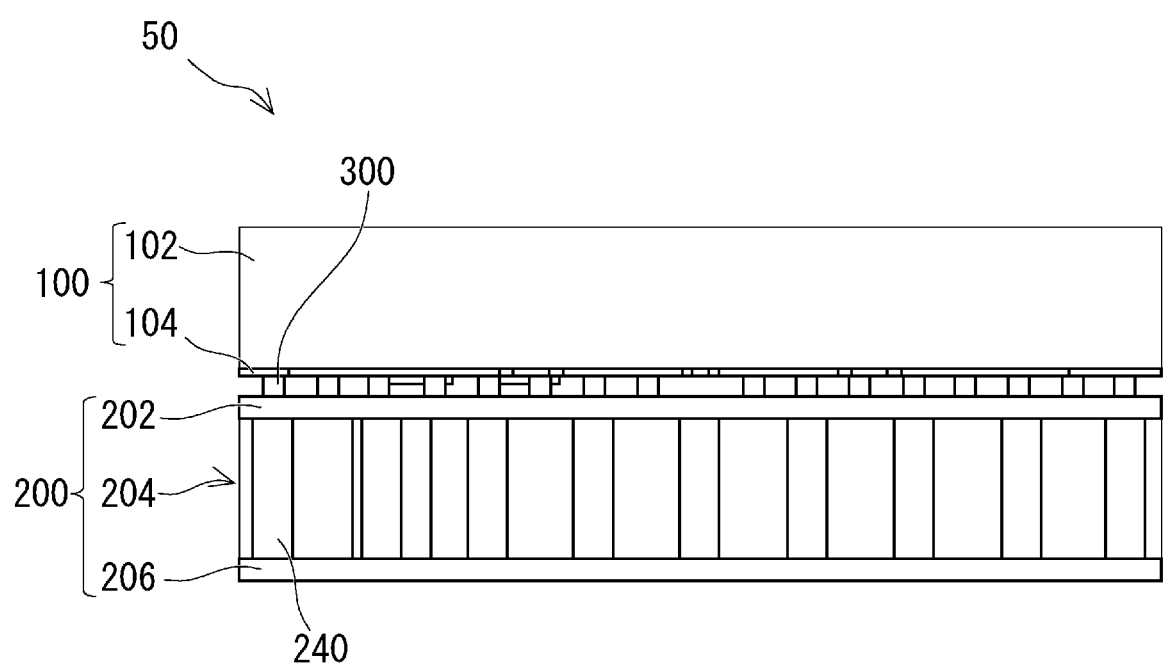
FIG. 4 is a view illustrating the configuration of the quantum device according to the first example embodiment.

FIGS. 2 to 4 are views illustrating a configuration of a quantum device 50 according to the first example embodiment. FIG. 2 is a perspective view illustrating a structure of the quantum device 50 according to the first example embodiment. FIG. 3 is an exploded view illustrating a stacked structure of the quantum device 50 according to the first example embodiment. FIG. 4 is a schematic view of the quantum device 50 according to the first example embodiment as viewed from the side. The quantum device 50 includes a quantum chip 100 and an interposer 200. The quantum device 50 corresponds to the quantum device 1 illustrated in FIG. 1. The quantum chip 100 corresponds to the quantum chip 10 illustrated in FIG. 1. The interposer 200 corresponds to the interposer 20 illustrated in FIG. 1. Furthermore, the quantum device 50 illustrated in FIGS. 2 to 4 corresponds to, for example, one quantum bit (1 bit).

Figure 5:
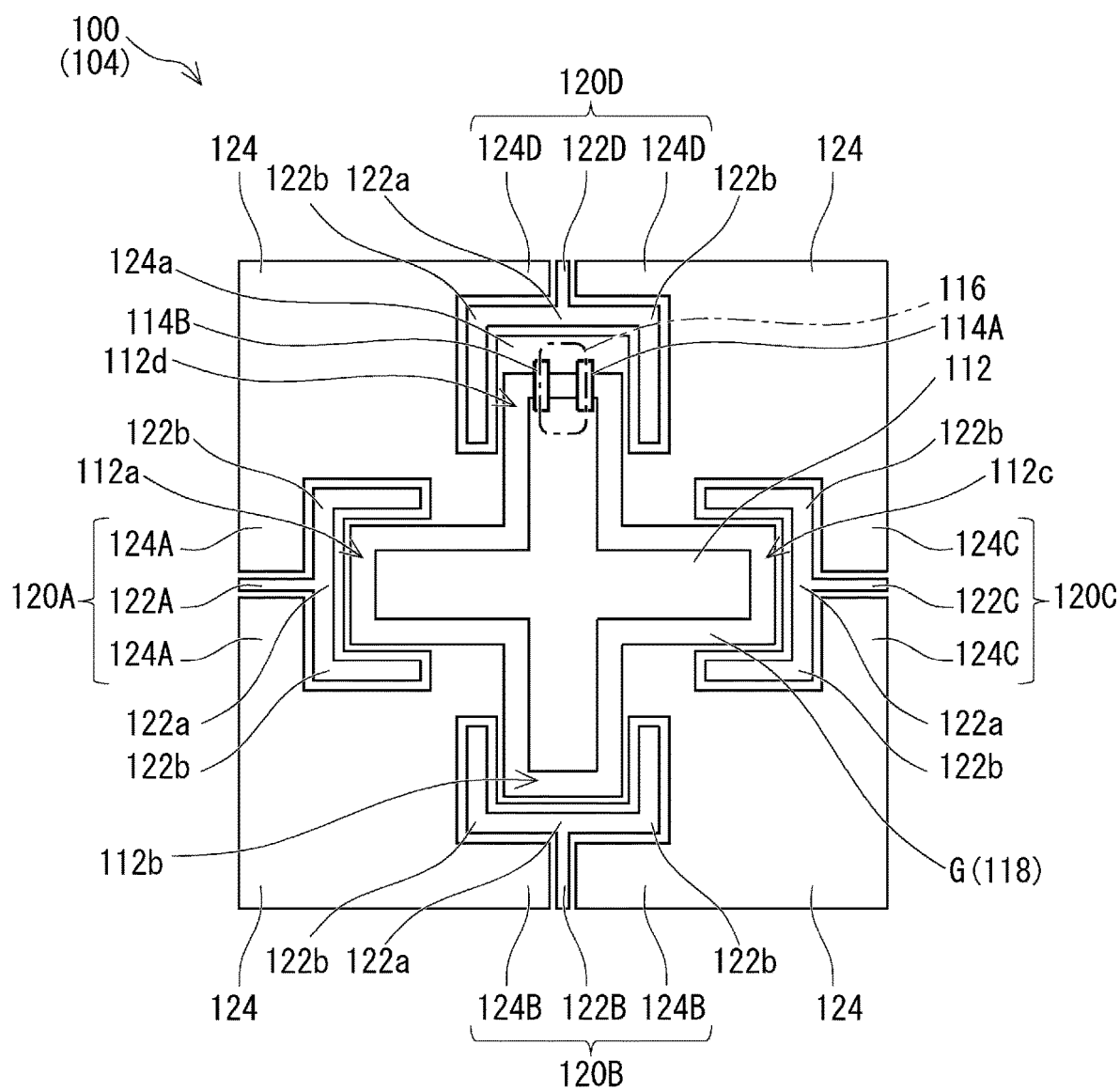
FIG. 5 is a plan view illustrating the configuration of the quantum chip according to the first example embodiment.
Figure 6:
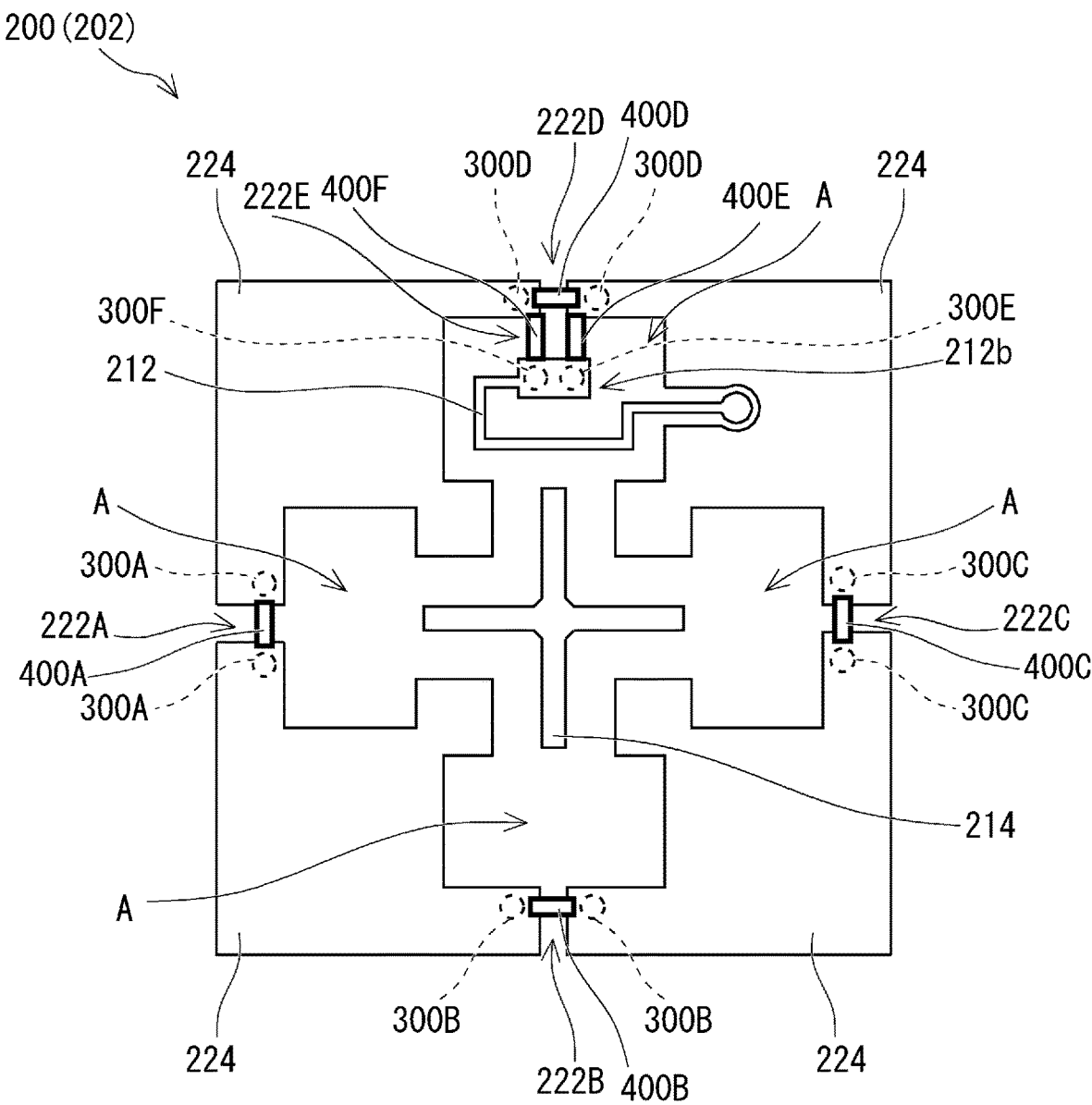
FIG. 6 is a plan view illustrating a configuration of an interposer according to the first example embodiment.

FIG. 5 is a plan view illustrating a configuration of the quantum chip 100 (superconducting wiring layer 104) according to the first example embodiment. FIG. 6 is a plan view illustrating a configuration of the interposer 200 (superconducting wiring layer 202) according to the first example embodiment. FIGS. 5 and 6 are views as viewed from above in FIG. 2. Therefore, the configuration of FIG. 5 overlaps the configuration of FIG. 6.

In FIG. 2, the quantum chip 100 and the interposer 200 are illustrated apart from each other for easy understanding of the structure, but actually, as illustrated in FIG. 4, the quantum chip and the interposer are connected to each other. Specifically, the quantum chip 100 and the interposer 200 are connected by flip chip connection via bumps 300. As a result, the quantum chip 100 is flip-chip mounted on the interposer 200. That is, the quantum chip 100 faces the interposer 200 via the bumps 300.

As illustrated in FIGS. 2 to 4, the quantum chip 100 includes a substrate 102 and a superconducting wiring layer 104. The superconducting wiring layer 104 is provided on a surface of the substrate 102 facing the interposer 200. As described below, circuits of a resonator 110 and couplers 122 are formed in the superconducting wiring layer 104. In the superconducting wiring layer 104, a ground electrode 124 (first ground electrode) is formed around the circuit of the resonator 110 and the couplers 122.

The interposer 200 includes the superconducting wiring layer 202, a substrate 204, and a superconducting wiring layer 206. The superconducting wiring layer 202 is provided on a surface of the substrate 204 on a side facing the quantum chip 100. The superconducting wiring layer 206 is provided on a surface of the substrate 204 opposite to the quantum chip 100. The interposer 200 is configured to connect the quantum chip 100 and an external circuit (not illustrated). As will be described below, circuits of a magnetic field application circuit 212 and a reading unit 214 are formed in the superconducting wiring layer 202. Thus, the interposer 200 may function as a quantum interposer. Ground electrodes 224 (second ground electrode) are formed in the superconducting wiring layer 202.

In the superconducting wiring layer 206, wires connected to the superconducting wiring layer 202 via through electrodes 240 provided in the substrate 204 are formed. For example, a wire 212a and a wire 214a for connecting the magnetic field application circuit 212 and the reading unit 214 to an external circuit are formed in the superconducting wiring layer 206. In the superconducting wiring layer 206, a ground electrode 250 (fourth ground electrode) is provided around the wire 212a and the wire 214a. The through electrodes 240 may be formed of a superconducting material. The through electrodes 240 penetrate the substrate 204 and connect the ground electrodes 224 and the ground electrode 250.

Here, for example, a silicon substrate is used as the substrate 102 and the substrate 204, but the material of the substrate is not limited thereto. For example, a sapphire substrate, a glass substrate, or the like may be used for the substrate 102 and the substrate 204. In the present example embodiment, the superconducting wiring layers 104, 202, and 206, the bumps 300, and the through electrodes 240 are realized by a superconductor. Examples of a material of the superconductor include niobium, niobium nitride, aluminum, indium, lead, tin, rhenium, palladium, titanium, titanium nitride, tantalum, and an alloy containing any of these. Note that all of the superconducting wiring layers 104, 202, and 206, the bumps 300, and the through electrodes 240 may not necessarily be realized by a superconductor, and a normal conductor may be used for at least a part except for the superconducting wiring layer 104. Examples of a material of the normal conductor include copper, silver, gold, platinum, and an alloy containing any of these. In order to realize a superconducting state, the quantum device 50 is used in a temperature environment of, for example, about 10 mK (milli-Kelvin) realized by a refrigerator.

As illustrated in FIGS. 2, 3, and 5, circuits of the resonator 110 and the couplers 122 are formed in the superconducting wiring layer 104. Specifically, the superconducting wiring layer 104 includes a conductive member 112 having a predetermined shape, a superconducting quantum interference device (SQUID) 116, the ground electrode 124, and the couplers 122. In the first example embodiment, the conductive member 112 is formed in a cross shape. The ground electrode 124 is formed around the conductive member 112 and the couplers 122. A space G is provided between the conductive member 112 and the ground electrode 124. The conductive member 112 is capacitively coupled to the ground electrode 124 via the space G. That is, the space G constitutes a capacitor 118 to be described below.

A pair of Josephson junctions 114A and 114B is provided between one end portion 112d of the conductive member 112 and a ground electrode 124a. A loop circuit formed by the pair of Josephson junctions 114A and 114B constitutes the SQUID 116. That is, one end of the SQUID 116 is connected to the conductive member 112, and the other end is connected to the ground electrode 124a. The conductive member 112 and the SQUID 116 constitute the resonator 110.

Couplers 122A to 122D are provided near four end portions 112a to 112d of the conductive member 112, respectively. The couplers 122 are configured to couple adjacent quantum bits. In other words, the couplers 122 are circuits for coupling with another resonator having a configuration similar to that of the resonator 110. The couplers 122 may be capacitively coupled with the resonator 110 (conductive member 112). Each coupler 122 is formed in the vicinity of the end portions 112a to 112d so as to surround each of the end portions 112a to 112d of the conductive member 112. Each coupler 122 has a discontinuous shape such as a branch portion 122a and a bent portion 122b. With such a shape, the couplers 122 each surround the corresponding one of the end portions 112a to 112d of the conductive member 112.

Coplanar lines 120 are formed by the couplers 122 and the ground electrode 124 around the couplers 122. For example, the coplanar lines 120 each are configured by providing an air gap in the ground electrode 124 and forming the coupler 122 as a center conductor at the center of the air gap. Accordingly, the coplanar line 120 corresponds to the coplanar line 12 illustrated in FIG. 1, the coupler 122 corresponds to the center conductor 12a illustrated in FIG. 1, and the ground electrode 124 corresponds to the first ground electrode 12b illustrated in FIG. 1. Note that the coplanar line 120 itself may function as a coupler. That is, the coplanar line 120 may correspond to a "coupler".

Specifically, as illustrated in FIG. 5, the coupler 122A is provided in the vicinity of the end portion 112a of the conductive member 112 at a position 90 degrees counterclockwise from an end portion 112d where the Josephson junction 114 (SQUID 116) is provided. The coupler 122A and the surrounding ground electrodes 124A form a coplanar line 120A. Similarly, the coupler 122B is provided in the vicinity of the end portion 112b at a position 90 degrees counterclockwise from the end portion 112a. The coupler 122B and the surrounding ground electrodes 124B form a coplanar line 120B. In addition, the coupler 122C is provided in the vicinity of the end portion 112c at a position 90 degrees counterclockwise from the end portion 112b. The coupler 122C and the surrounding ground electrodes 124C form a coplanar line 120C. The coupler 122D is provided in the vicinity of the end portion 112d. The coupler 122D and the surrounding ground electrodes 124D form a coplanar line 120D. That is, in the first example embodiment, the coupler 122D (coplanar line 120D) is provided in the vicinity of the SQUID 116.

As illustrated in FIGS. 2, 3, and 6, the ground electrodes 224 are formed in the superconducting wiring layer 202. Here, a space A is provided in the superconducting wiring layer 202 at a location facing the resonator 110 and the couplers 122 of the superconducting wiring layer 104. That is, the ground electrodes 224 are not formed in a region of the superconducting wiring layer 202 facing the resonator 110 and the couplers 122 of the superconducting wiring layer 104. This is because when the resonator 110 and the couplers 122 are close to the ground electrodes 224, characteristics of the quantum bit are deteriorated. Specifically, this is because, when the resonator 110 and the couplers 122 are close to the ground electrodes 224, a resonance frequency and a Q value (Quality factor) of the resonator 110, a coupling degree of the couplers 122, a characteristic impedance of the coplanar lines 120, and the like are affected. The ground electrodes 224 are connected to the ground electrode 124 via a large number of bumps 300. That is, the plurality of bumps 300 is arranged between the ground electrode 124 and the ground electrodes 224. In addition, the plurality of bumps 300 is arranged in a lattice shape or randomly.

In addition, the magnetic field application circuit 212 and the reading unit 214 are provided in the space A. The magnetic field application circuit 212 is provided at a position facing the SQUID 116 and is magnetically coupled to the SQUID 116. The magnetic field application circuit 212 applies a magnetic field to the SQUID 116. The magnetic field is a direct magnetic field or an alternating magnetic field. The resonator 110 and the magnetic field application circuit 212 constitute an oscillator 60 to be described below. Therefore, it can be said that the quantum device 50 constitutes the oscillator 60 (quantum bit, quantum bit circuit).

The magnetic field application circuit 212 is formed by an electrode or a wire having a predetermined shape. Specifically, as illustrated in FIGS. 2 and 6, the magnetic field application circuit 212 is configured by an electrode or a wire having a partially cutaway annular shape, that is, a C-shape. That is, the magnetic field application circuit 212 includes a substantially annular electrode and wire. When a current flows through the magnetic field application circuit 212, a magnetic field penetrating the inside of a current path along the substantially annular electrode and wire is generated. In addition, the magnetic field application circuit 212 may be magnetically coupled to the SQUID 116, and may not have a substantially annular shape. The ground electrode 212b (third ground electrode) of the magnetic field application circuit 212 is connected to the ground electrode 124a via bumps 300E and 300F. The ground electrode 212b only needs to be connected to the ground electrode, and is not necessarily connected to the ground electrode 124a, and may be connected to the ground electrode 224 or the ground electrode 250.

The reading unit 214 is provided at a position facing the conductive member 112, and is capacitively coupled to the conductive member 112. The reading unit 214 is an electrode for reading the internal state of the resonator 110 (oscillator 60), that is, an oscillation state. The reading unit 214 is connected to an external circuit (control unit) that acquires the internal state of the resonator 110 (oscillator 60) via the superconducting wiring layer 206 (wire 214a). The shape of the reading unit 214 is, for example, a shape corresponding to the shape of the conductive member 112. In the present example embodiment, the shape of the reading unit 214 is a cross shape. In addition, the reading unit 214 may be capacitively coupled to the conductive member 112, and the shape thereof may not be a cross shape. Note that the size of the quantum device 50 can be reduced by providing the magnetic field application circuit 212 and the reading unit 214 on the lower side of the quantum chip 100.

Figure 7:
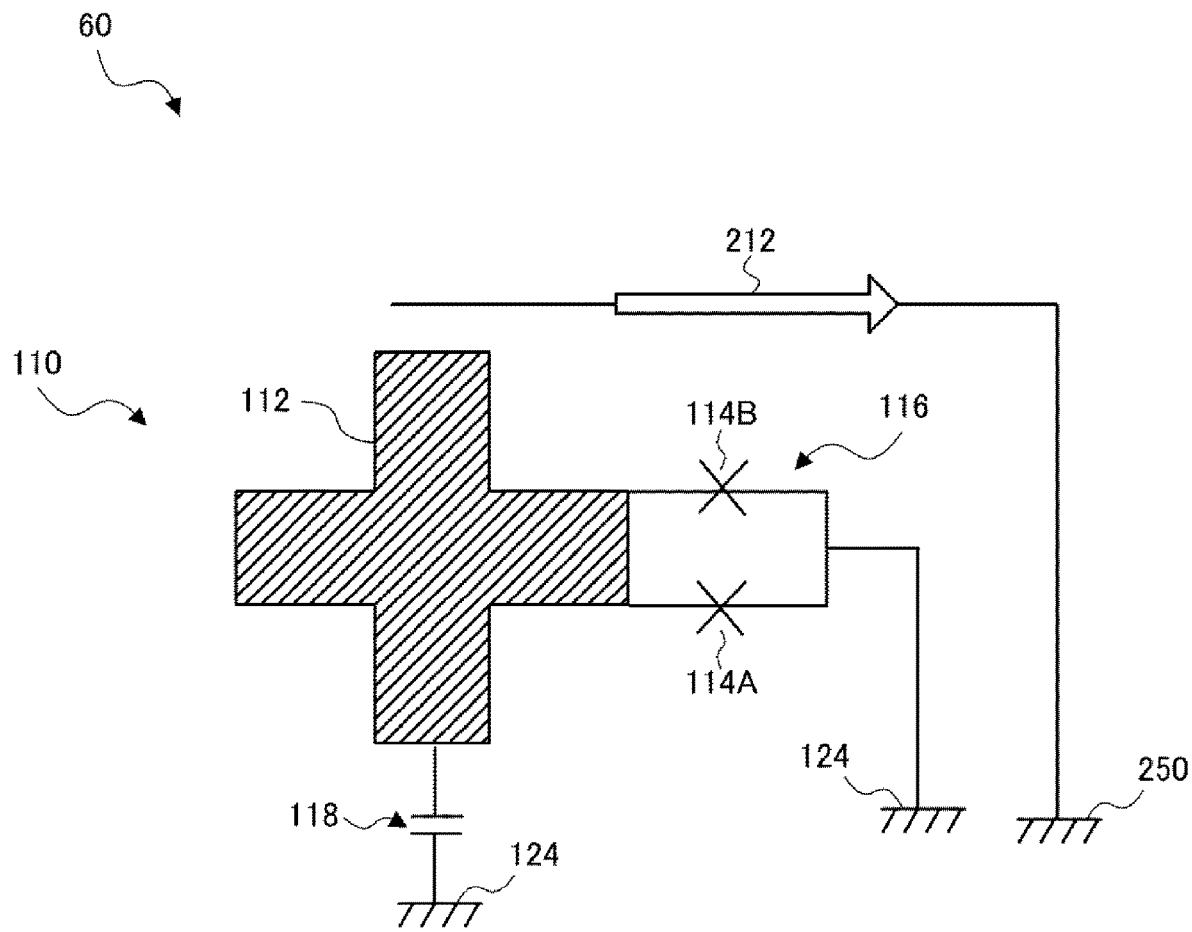
FIG. 7 is a circuit diagram illustrating an oscillator according to the first example embodiment.
Figure 8:
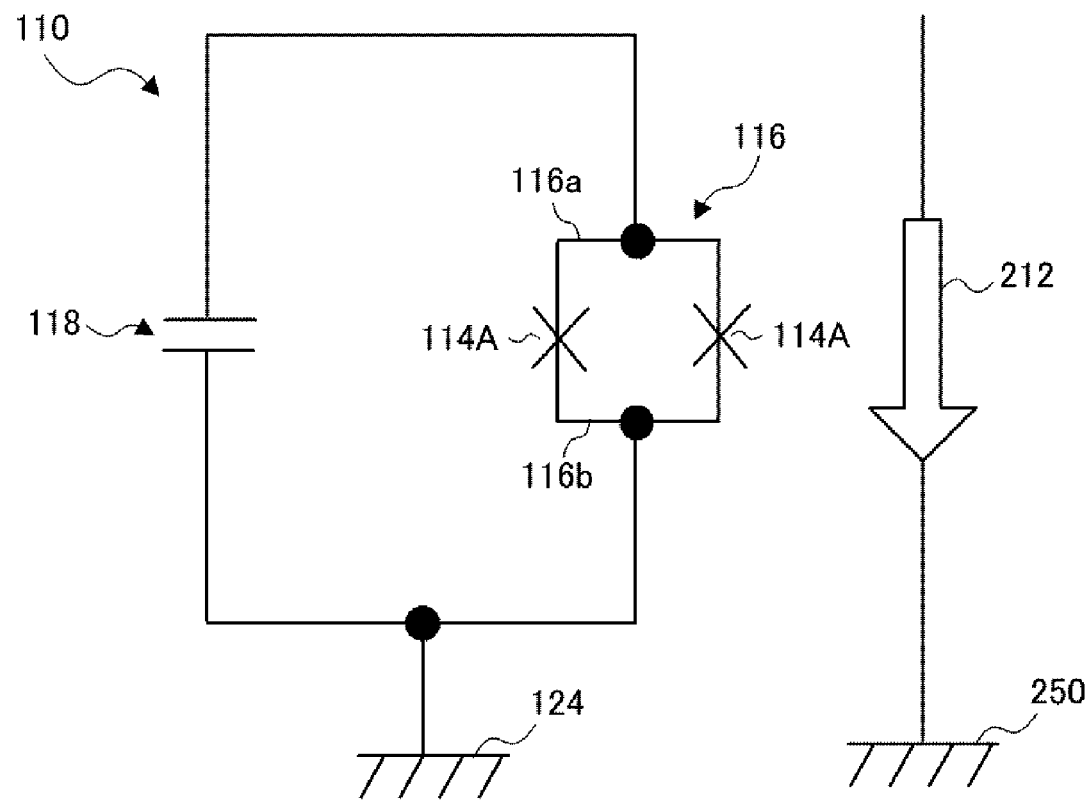
FIG. 8 is a diagram illustrating an equivalent circuit of the oscillator according to the first example embodiment.

FIG. 7 is a circuit diagram illustrating the oscillator 60 according to the first example embodiment. FIG. 8 is a diagram illustrating an equivalent circuit of the oscillator 60 according to the first example embodiment. The oscillator 60 includes the resonator 110 and the magnetic field application circuit 212. The resonator 110 includes the SQUID 116 and the capacitor 118. The SQUID 116 is shunted by the capacitor 118 via the conductive member 112.

The SQUID 116 is a circuit in which two Josephson junctions 114 (114A, 114B) are annularly connected by a superconducting line. That is, the SQUID 116 is an annular loop circuit having two Josephson junctions 114 (114A, 114B). Here, the Josephson junction refers to an element having a structure in which a thin insulating film is sandwiched between two superconductors. More specifically, as illustrated in FIG. 8, the SQUID 116 includes a first superconducting line 116a connecting the Josephson junction 114A and the Josephson junction 114B, and a second superconducting line 116b connecting the Josephson junction 114A and the Josephson junction 114B. In other words, the resonator 110 includes the SQUID 116, which is a loop circuit in which the first superconducting line 116a and the second superconducting line 116b are joined by the Josephson junction 114A and the Josephson junction 114B. As illustrated in FIG. 8, the first superconducting line 116a, the Josephson junction 114A, the second superconducting line 116b, and the Josephson junction 114B are annularly connected to form a loop circuit (that is, the SQUID 116). In other words, in the SQUID 116, the first superconducting line 116a and the second superconducting line 116b are joined by the Josephson junction 114A and the Josephson junction 114B to form a loop.

The description returns to the description using FIGS. 2 to 6. As described above, the ground electrodes 224 are not formed in the region of the superconducting wiring layer 202 facing the couplers 122. Therefore, as illustrated in FIGS. 2, 3, and 6, gaps 222 are provided at a position of the superconducting wiring layer 202 facing the couplers 122. Specifically, a gap 222A is formed at a position facing the coupler 122A. Similarly, a gap 222B is formed at a position facing the coupler 122B. A gap 222C is formed at a position facing the coupler 122C. Further, a gap 222D is formed at a position facing the coupler 122D. Further, a gap 222E is provided at a location facing the coupler 122D and between the magnetic field application circuit 212 (ground electrode 212b) and the ground electrodes 224. In FIG. 2, a space is formed in a region of the superconducting wiring layer 202 facing the couplers 122, but the present disclosure is not limited to such a configuration. The dielectric (substrate 204) may be exposed to a region facing the couplers 122 (a region where the ground electrodes 224 are not formed). In this case, the gaps 222 are formed such that the dielectric is exposed.

In the first example embodiment, a bridge electrode 400 having a bridge shape is provided in each gap 222. That is, the interposer 200 includes the bridge electrode 400 formed across the gap 222. The bridge electrode 400 is formed of a conductor (superconductor). The bridge electrode 400 corresponds to the connection electrode 40 illustrated in FIG. 1. That is, the connection electrode 40 includes the bridge electrode 400 (first bridge electrode, second bridge electrode).

Specifically, a bridge electrode 400A (first bridge electrode) is provided in the gap 222A. Similarly, a bridge electrode 400B (first bridge electrode) is provided in the gap 222B. A bridge electrode 400C (first bridge electrode) is provided in the gap 222C. A bridge electrode 400D (first bridge electrode) is provided in the gap 222D. A bridge electrode 400E and a bridge electrode 400F (second bridge electrode) are provided in the gap 222E.

Figure 9:
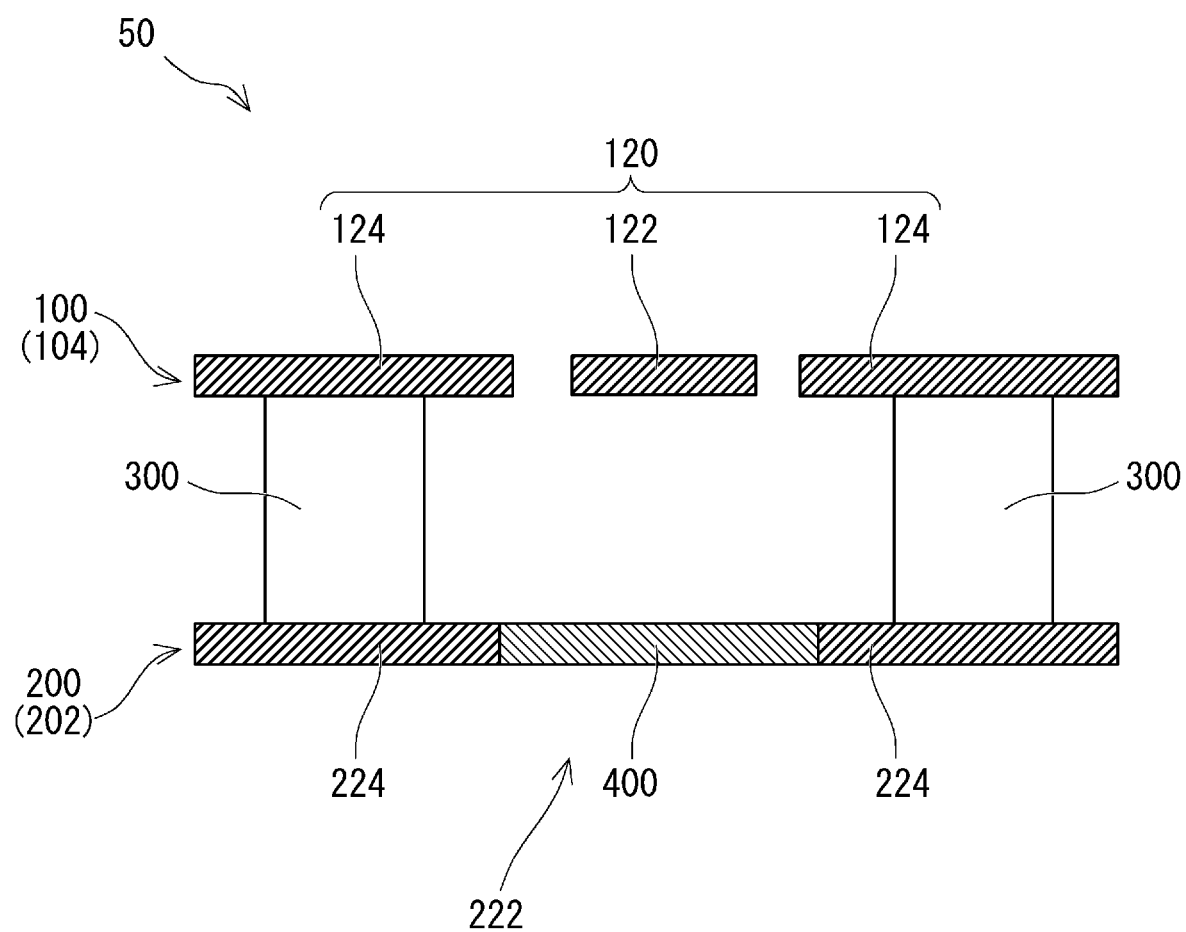
FIG. 9 is a side view illustrating a structure around a gap according to the first example embodiment.

FIG. 9 is a side view illustrating a structure around the gap 222 according to the first example embodiment. The bridge electrode 400 is formed in a part of the gap 222. The bridge electrode 400 is formed in a bridge shape so as to partially connect the ground electrodes 224 around (on both sides of) the gap 222. In other words, the ground electrodes 224 around the gap 222 are partially connected by the bridge electrode 400. In other words, the bridge electrode 400 is formed across the gap 222. As a result, a potential difference between potentials of the ground electrodes 224 (ground potential) around the gap 222 can be reduced. Ideally, the potentials (ground potential) of the ground electrodes 224 around the gap 222 can be set to an equal potential by the bridge electrode 400.

Note that although FIG. 2 illustrates the bridge electrodes 400 in an arc shape, FIG. 2 merely schematically illustrates the bridge electrodes 400, and in practice, the bridge electrodes 400 do not need to be formed in an arc shape. Rather, as illustrated in FIG. 9, the bridge electrodes 400 are formed so as not to be in contact with the superconducting wiring layer 104 (couplers 122). That is, the bridge electrodes 400 are desirably formed as far as possible from the superconducting wiring layer 104 of the quantum chip 100 in order to suppress the deterioration of the characteristics of the quantum bits described above. Therefore, a part of the bridge electrodes 400 (connection electrodes) faces the coupler 122 (center conductor) via a space. As illustrated in FIG. 6, in the first example embodiment, the bridge electrodes 400 are linearly formed. As illustrated in FIG. 9, the bridge electrodes 400 may be provided on the same plane as the ground electrodes 224 (superconducting wiring layer 202). The bridge electrodes 400 may be formed integrally with the ground electrodes 224 (superconducting wiring layer 202) on both sides of the gap 222. By forming the bridge electrodes 400 in this manner, the bridge electrodes 400 can be easily formed.

As described above, since the ground electrodes 224 are connected to the ground electrode 124 via the bumps 300, a large number of bumps 300 are connected to the ground electrodes 224. Therefore, the bumps 300 can be provided in the vicinity of the bridge electrodes 400. Specifically, in the vicinity of the bridge electrode 400A, bumps 300A are provided on both sides. Similarly, in the vicinity of the bridge electrode 400B, bumps 300B are provided on both sides thereof. In the vicinity of the bridge electrode 400C, bumps 300C are provided on both sides thereof. In the vicinity of the bridge electrode 400D, bumps 300D are provided on both sides thereof. In the vicinity of the bridge electrode 400E, the bump 300D is provided at one end thereof, and the bump 300E is provided at a location corresponding to the magnetic field application circuit 212 at the other end thereof. In the vicinity of the bridge electrode 400F, the bump 300D is provided at one end, and the bump 300F is provided at a location corresponding to the magnetic field application circuit 212 at the other end thereof.

The bumps 300 are connected to the ground electrodes 224 and are also connected to the ground electrode 124. Therefore, as illustrated in FIG. 9, the ground electrodes 124 on both sides of the coupler 122 corresponding to the center conductor in the coplanar line 120 are connected via the bumps 300, the ground electrodes 224, the bridge electrode 400, the ground electrodes 224, and the bumps 300. Therefore, a U-shaped transmission path is formed by the bumps 300, the ground electrodes 224, the bridge electrodes 400, the ground electrodes 224, and the bumps 300. The U-shaped transmission path functions as an air bridge that connects the ground electrodes 124 on both sides of the coupler 122.

Specifically, as illustrated in FIGS. 5 and 6, the ground electrodes 124A around the coupler 122A are connected by the bumps 300A, the ground electrodes 224, the bridge electrode 400A, the ground electrodes 224, and the bumps 300A. Similarly, the ground electrodes 124B around the coupler 122B are connected by the bumps 300B, the ground electrodes 224, the bridge electrode 400B, the ground electrodes 224, and the bumps 300B. The ground electrodes 124C around the coupler 122C are connected by the bumps 300C, the ground electrodes 224, the bridge electrode 400C, the ground electrodes 224, and the bumps 300C. The ground electrodes 124D around the coupler 122D are connected by the bumps 300D, the ground electrodes 224, the bridge electrode 400D, the ground electrodes 224, and the bumps 300D.

Furthermore, the ground electrode 124a and the ground electrodes 124D around the coupler 122D are connected by the bumps 300E, the ground electrode 212b of the magnetic field application circuit 212, the bridge electrode 400E, the ground electrodes 224, and the bumps 300D. In addition, the ground electrode 124a and the ground electrodes 124D around the coupler 122D are connected by the bumps 300F, the ground electrode 212b of the magnetic field application circuit 212, the bridge electrode 400F, the ground electrodes 224, and the bumps 300D. Although FIG. 6 illustrates six bridge electrodes 400, the number of bridge electrodes 400 is not limited to six. The bridge electrodes 400 may be formed so as to face the couplers 122, which are the center conductor of the coplanar lines 120, and formed across an arbitrary gap 222 provided with the bumps 300 therearound.

As described above, in the first example embodiment, the bumps 300, the ground electrodes 224, the bridge electrodes 400, the ground electrodes 224, and the bumps 300 function as an air bridge that connects the ground electrodes 124 on both sides of the couplers 122. As a result, the potential difference between the ground electrodes 124 on both sides of the couplers 122 can be reduced. Preferably, the potential difference between the ground electrodes 124 on both sides of the couplers 122 can be set to 0. As a result, it is possible to suppress the occurrence of the energy leakage mode such as the slot line mode or the coupled slot line mode, which is an undesirable mode. That is, it is possible to prevent an electromagnetic field distribution in a width direction (lateral direction in FIG. 9) from being asymmetric in the center conductor (the coupler 122) and the ground electrodes 124 around the center conductor. As a result, it is possible to suppress leakage of energy between the ground electrodes 124 across the center conductor. Therefore, deterioration in the performance of the quantum bit can be suppressed. Specifically, unnecessary interference between the quantum bits is reduced, so that the coherence of the quantum bits can be improved.

Here, as described in Patent Literature 2, in order to suppress the occurrence of the energy leakage mode such as the slot line mode, an air bridge across waveguides may be formed. However, as described above, in a case where the quantum chip 100 and the interposer 200 are flip-chip mounted, it is not preferable to provide an air bridge from the viewpoint of technology and space. Meanwhile, in the first example embodiment, since the same function as the air bridge can be realized without providing the air bridge, the occurrence of the energy leakage mode can be suppressed. Therefore, in the quantum device 50 according to the first example embodiment, even when flip-chip mounting is performed, it is possible to suppress deterioration in the performance of the quantum bit.

As described above, when the couplers 122 approach the ground electrodes 224, the characteristics of the quantum bit are deteriorated, and thus, it is not preferable to form a large number of bridge electrodes 400 in one gap 222. Meanwhile, in order to suppress the occurrence of the energy leakage mode such as the slot line mode in the coplanar lines 120, it is preferable to provide a large number of bridge electrodes 400. Therefore, the number of bridge electrodes 400 can be appropriately set according to design conditions, for example.

It is preferable that the bridge electrodes 400 are not provided at a position facing the resonator 110 (the conductive member 112 and the SQUID 116). As a result, degradation in the performance of the quantum bit (resonator 110) can be suppressed. For example, deterioration of coherence can be suppressed by providing the bridge electrodes 400 at a position not facing the resonator 110 (the conductive member 112 and the SQUID 116). Note that the coherence is, for example, a coherence time that is a time during which the oscillator 60 functions as the quantum bit.

In addition, the occurrence of the energy leakage mode described above is likely to occur in a discontinuous shape of the couplers 122 such as branching or bending of the coplanar lines 120. Therefore, it is desirable that the bridge electrodes 400 are provided at locations corresponding to the discontinuous shape of the couplers 122. For example, as illustrated in FIGS. 5 and 6, the bridge electrode 400A is formed in the vicinity of the branch portion 122a of the coupler 122A. Similarly, the bridge electrode 400B is formed in the vicinity of the branch portion 122a of the coupler 122B. The bridge electrode 400C is formed in the vicinity of the branch portion 122a of the coupler 122C. The bridge electrode 400D is formed in the vicinity of the branch portion 122a of the coupler 122D. The bridge electrodes 400E and 400F are formed near the branch portion 122a and the bent portion 122b of the coupler 122D.

In addition, a gap 222E is provided between the ground electrode 212b and the ground electrodes 224 of the magnetic field application circuit 212 at a position facing a coupler 122D (center conductor) in the vicinity of the SQUID 116. The bridge electrode 400E and the bridge electrode 400F are formed across the gap 222E. The ground electrode 212b and the ground electrodes 224 are partially connected by the bridge electrode 400E and the bridge electrode 400F. One ends of the bridge electrodes 400E and 400F are located near the bumps 300E and 300F connected to the ground electrode 124 and the ground electrode 212b, and the other ends are located near the bumps 300 connected to the ground electrode 124 and the ground electrodes 224. As a result, the ground electrodes around the coupler 122D are connected by the three bridge electrodes 400D, 400E, and 400F. Further, the three bridge electrodes 400D, 400E, and 400F are formed in the vicinity of the branch portion 122a of the coupler 122D. Therefore, the occurrence of the energy leakage mode can be more effectively suppressed. Note that this configuration is also applicable to other example embodiments described below.

In the present example embodiment, the plurality of bumps 300 is arranged in a lattice shape or randomly between ground electrode 124 and ground electrodes 224. This increases a possibility that bumps 300 are arranged in the vicinity of the bridge electrodes 400. Furthermore, since the bumps 300 are arranged in this manner, the ground electrode 124 and the ground electrodes 224 are more reliably connected.

Second Example Embodiment

Next, a second example embodiment will be described. For clarity of description, in the following description and figures, omission and simplification are made as appropriate. In the figures, the same elements are denoted by the same reference numerals, and redundant description is omitted as necessary. In the second example embodiment, components corresponding to the connection electrode 40 illustrated in FIG. 1 are different from those in the first example embodiment.

Figure 10:
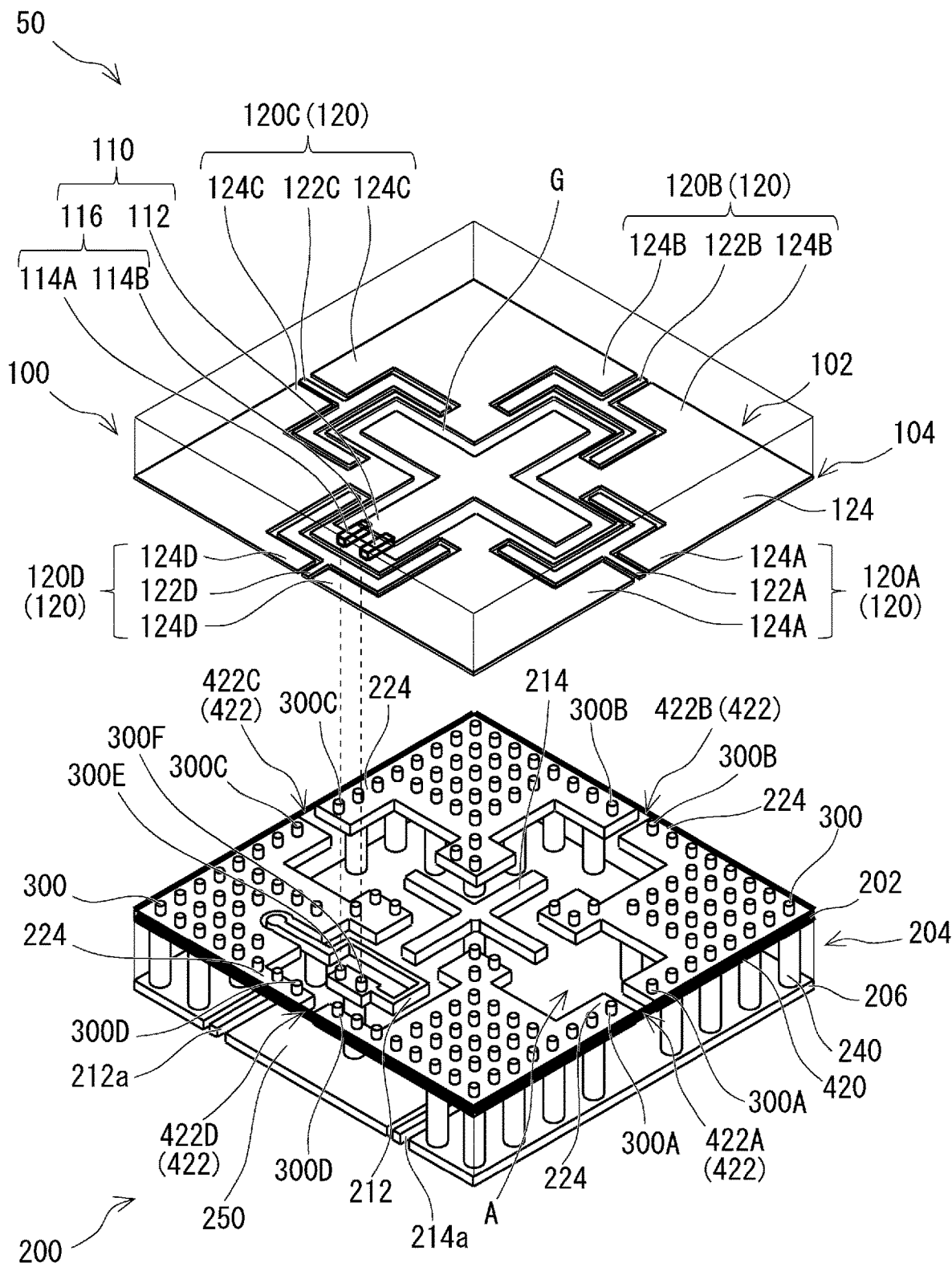
FIG. 10 is a view illustrating a configuration of a quantum device according to a second example embodiment.

FIG. 10 is a view illustrating a configuration of a quantum device 50 according to the second example embodiment. FIG. 10 is a perspective view illustrating the quantum device 50 according to the second example embodiment. FIG. 10 corresponds to FIG. 2 according to the first example embodiment.

Similarly to the first example embodiment, the quantum device 50 according to the second embodiment includes a quantum chip 100 and an interposer 200. Since the configuration of the quantum chip 100 is substantially similar to that according to the first example embodiment, the description thereof will be omitted. In addition, the configuration of the interposer 200 is substantially similar to that according to the first example embodiment except for the bridge electrodes 400, and thus the description thereof will be omitted. For the positions of the gaps 222 (222A to 222D), refer to FIG. 2.

The interposer 200 according to the second example embodiment has an outer frame structure 420 of a conductor (superconductor) formed so as to surround the superconducting wiring layer 202 of the interposer 200. The outer frame structure 420 is formed integrally with ground electrodes 224. The outer frame structure 420 includes an outer frame portion 422A corresponding to a gap 222A, an outer frame portion 422B corresponding to a gap 222B, an outer frame portion 422C corresponding to a gap 222C, and an outer frame portion 422D corresponding to a gap 222D. That is, the outer frame portion 422 is provided at a position corresponding to each gap 222 of outer frame structure 420.

The outer frame portion 422 connects ground electrodes 224 around (at both ends of) the gap 222. That is, the outer frame portion 422 corresponds to the connection electrode 40 illustrated in FIG. 1. In other words, the connection electrode 40 includes the outer frame portion 422. In other words, the outer frame portion 422 functions as the connection electrode 40 illustrated in FIG. 1. Therefore, bumps 300 formed in the vicinity of the outer frame portion 422 are connected to ground electrode 124 and the ground electrodes 224.

Specifically, in the vicinity of the outer frame portion 422A, bumps 300A are provided on both sides thereof. Similarly, in the vicinity of outer frame portion 422B, bumps 300B are provided on both sides thereof. In the vicinity of outer frame portion 422C, bumps 300C are provided on both sides thereof. In the vicinity of outer frame portion 422D, bumps 300D are provided on both sides thereof.

Therefore, as described in the first example embodiment with reference to FIG. 9, the ground electrodes 124 on both sides of the coupler 122 corresponding to the center conductor in the coplanar line 120 are connected via the bumps 300, the ground electrodes 224, the outer frame portion 422, the ground electrodes 224, and the bumps 300. As a result, a U-shaped transmission path is formed by the bumps 300, the ground electrodes 224, the outer frame portion 422, the ground electrodes 224, and the bumps 300. The U-shaped transmission path functions as an air bridge that connects the ground electrodes 124 on both sides of the coupler 122.

Specifically, the ground electrodes 124A around the coupler 122A are connected by the bumps 300A, the ground electrodes 224, the outer frame portion 422A, the ground electrodes 224, and the bumps 300A. Similarly, the ground electrodes 124B around the coupler 122B are connected by the bumps 300B, the ground electrodes 224, the outer frame portion 422B, the ground electrodes 224, and the bumps 300B. The ground electrodes 124C around the coupler 122C are connected by the bumps 300C, the ground electrodes 224, the outer frame portion 422C, the ground electrodes 224, and the bumps 300C. The ground electrodes 124D around the coupler 122D are connected by the bumps 300D, the ground electrodes 224, the outer frame portion 422D, the ground electrodes 224, and the bumps 300D.

As described above, in the second example embodiment, the bumps 300, the ground electrodes 224, the outer frame portion 422, the ground electrodes 224, and the bumps 300 function as an air bridge that connects the ground electrodes 124 on both sides of the coupler 122. Therefore, as in the second example embodiment, by providing the outer frame structure 420 of the conductor formed so as to surround the superconducting wiring layer 202 of the interposer 200 and integrated with the ground electrodes 224, the same effects as those of the first example embodiment can be obtained. That is, also in second example embodiment, the potential difference between the ground electrodes 124 on both sides of the coupler 122 can be reduced. Preferably, the potential difference between the ground electrodes 124 on both sides of the couplers 122 can be set to 0. Therefore, the configuration according to the second example embodiment can also suppress the occurrence of the energy leakage mode in the coupler 122.

In an outer peripheral portion of the interposer 200, since there is a low possibility that wires necessary for realizing the quantum bit is arranged, the degree of freedom of the wire is high. Therefore, even when the ground electrode is arranged on the outer peripheral portion of the interposer 200, the possibility of affecting the overall arrangement is extremely low. Therefore, by providing the outer frame structure 420, it is possible to easily form the outer frame portion 422 having substantially the same function as the bridge electrodes 400 according to the first example embodiment. That is, the connection electrode 40 can be easily arranged as compared with the configuration according to the first example embodiment.

Third Example Embodiment

Next, a third example embodiment will be described. For clarity of description, in the following description and figures, omission and simplification are made as appropriate. In the figures, the same elements are denoted by the same reference numerals, and redundant description is omitted as necessary. In the third example embodiment, components corresponding to the connection electrode 40 illustrated in FIG. 1 are different from those of the other embodiments.

Figure 11:
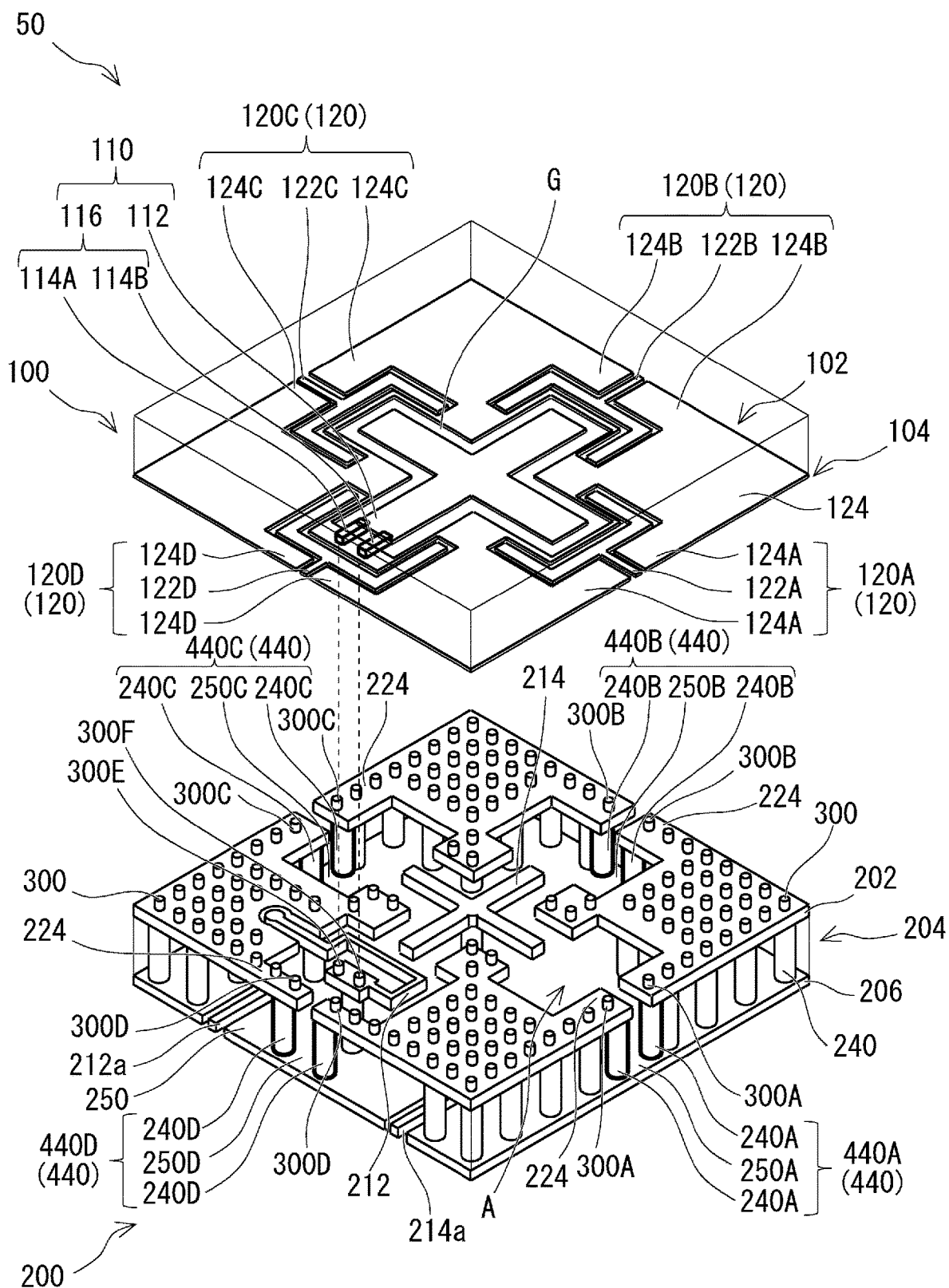
FIG. 11 is a view illustrating a configuration of a quantum device according to a third example embodiment.

FIG. 11 is a view illustrating a configuration of a quantum device 50 according to the third example embodiment. FIG. 11 is a perspective view illustrating the quantum device 50 according to the third example embodiment. FIG. 11 corresponds to FIG. 2 according to the first example embodiment.

Similarly to the first example embodiment, the quantum device 50 according to the third example embodiment includes a quantum chip 100 and an interposer 200. Since the configuration of the quantum chip 100 is substantially similar to that according to the first example embodiment, the description thereof will be omitted. In addition, the configuration of the interposer 200 is substantially similar to that according to the first example embodiment except for the bridge electrodes 400, and thus the description thereof will be omitted. For the positions of the gaps 222 (222A to 222D), refer to FIG. 2.

Figure 12:
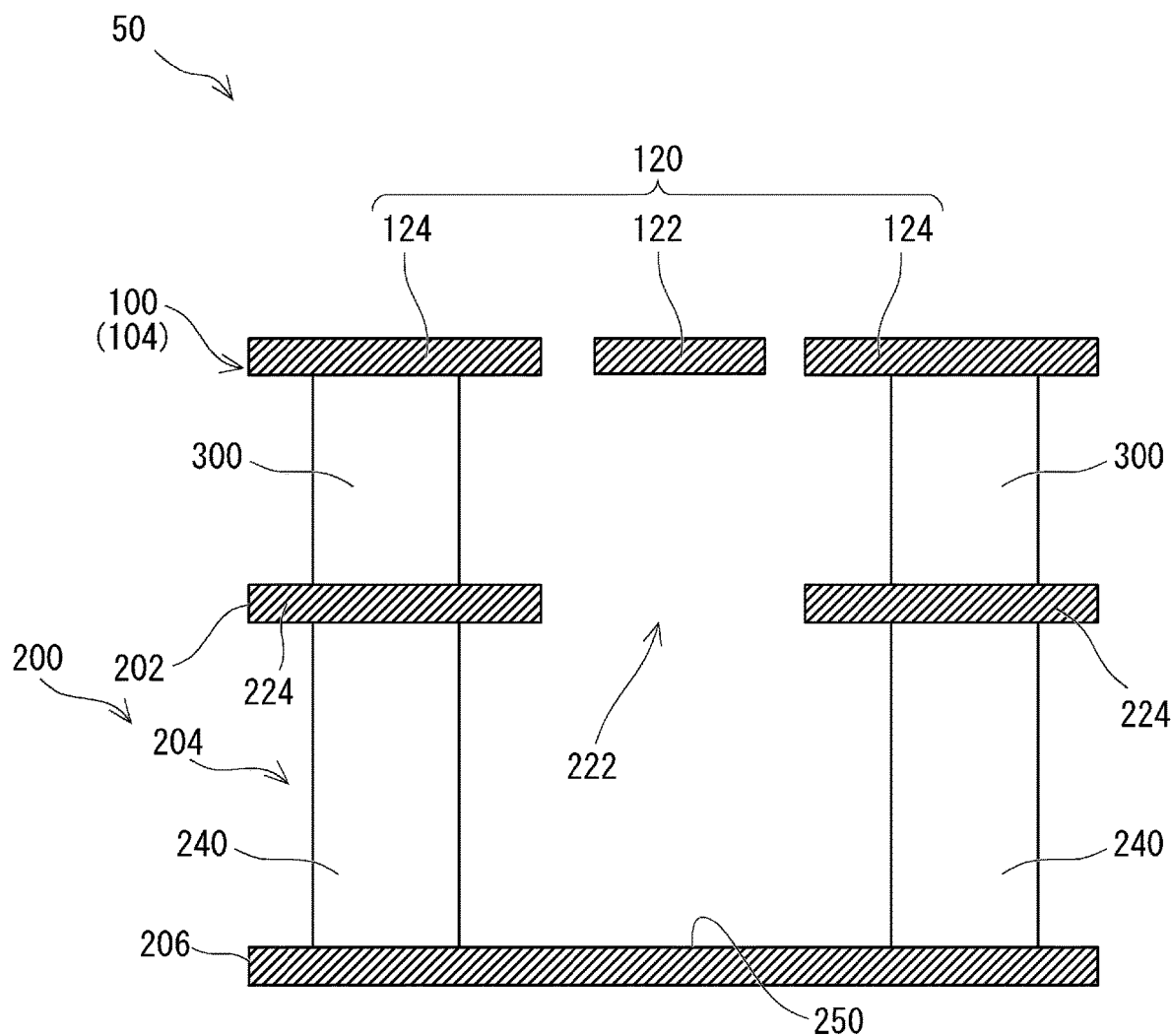
FIG. 12 is a side view illustrating a structure around a gap according to the third example embodiment.

FIG. 12 is a side view illustrating a structure around a gap 222 according to the third example embodiment. In the third example embodiment, through electrodes 240 are provided in the vicinity of the gap 222. Ground electrodes 224 around (on both sides of) the gap 222 are connected by the through electrodes 240 and a ground electrode 250 (fourth ground electrode). Therefore, the through electrodes 240 and the ground electrode 250 correspond to the connection electrode 40 illustrated in FIG. 1. In other words, the through electrodes 240 and the ground electrode 250 constitute a connection electrode 440. In other words, the through electrodes 240 and the ground electrode 250 function as the connection electrode 440. In other words, the connection electrode 440 includes the through electrodes 240 and the ground electrode 250. With such a configuration, a part of the connection electrode 440 (a part of the ground electrode 250) faces the coupler 122 (center conductor) via a space interposed therebetween.

Specifically, through electrodes 240A are formed near both sides of a gap 222A. The ground electrodes 224 around the gap 222A is connected by a connection electrode 440A including the through electrodes 240A and the ground electrode 250A. Similarly, through electrodes 240B are formed near both sides of a gap 222B. The ground electrodes 224 around the gap 222B is connected by a connection electrode 440B including the through electrodes 240B and the ground electrode 250B. Through electrodes 240C are formed near both sides of a gap 222C. The ground electrodes 224 around the gap 222C is connected by a connection electrode 440C including the through electrodes 240C and the ground electrode 250C. Through electrodes 240D are formed near both sides of a gap 222D. The ground electrodes 224 around the gap 222D are connected by a connection electrode 440D including the through electrodes 240D and the ground electrode 250D.

As described above, the bumps 300 are connected to the ground electrodes 224 and are also connected to the ground electrode 124. Therefore, as illustrated in FIG. 12, the ground electrodes 124 on both sides of the coupler 122 are connected via the bumps 300, the ground electrodes 224, the through electrodes 240, the ground electrode 250, the through electrodes 240, the ground electrodes 224, and the bumps 300. Therefore, a U-shaped transmission path is formed by the bumps 300, the ground electrodes 224, the through electrodes 240, the ground electrode 250, the through electrodes 240, the ground electrodes 224, and the bumps 300. The U-shaped transmission path functions as an air bridge that connects the ground electrodes 124 on both sides of the coupler 122.

Specifically, the ground electrodes 124A around the coupler 122A is connected by the bumps 300A, the ground electrodes 224, the through electrodes 240A, the ground electrode 250A, the through electrodes 240A, the ground electrodes 224, and the bumps 300A. Similarly, the ground electrodes 124B around the coupler 122B is connected by the bumps 300B, the ground electrodes 224, the through electrodes 240B, the ground electrode 250B, the through electrodes 240B, the ground electrodes 224, and the bumps 300B. In addition, the ground electrodes 124C around the coupler 122C is connected by the bumps 300C, the ground electrodes 224, the through electrodes 240C, the ground electrode 250C, the through electrodes 240C, the ground electrodes 224, and the bumps 300C. In addition, the ground electrodes 124D around the coupler 122D is connected by the bumps 300D, the ground electrodes 224, the through electrodes 240D, the ground electrode 250D, the through electrodes 240D, the ground electrodes 224, and the bumps 300D.

As described above, in third example embodiment, the bumps 300, the ground electrodes 224, the through electrodes 240, the ground electrode 250, the through electrodes 240, the ground electrodes 224, and the bumps 300 function as an air bridge that connects the ground electrodes 124 on both sides of the couplers 122. Therefore, also in the third example embodiment, the same effects as those of the first example embodiment can be obtained. That is, also in third example embodiment, the potential difference between the ground electrodes 124 on both sides of the couplers 122 can be reduced. Preferably, the potential difference between the ground electrodes 124 on both sides of the couplers 122 can be set to 0. Therefore, the configuration according to third example embodiment can also suppress the occurrence of the energy leakage mode in the couplers 122.

Furthermore, in third example embodiment, the potential difference between the ground electrodes 124 on both sides of the couplers 122 can be reduced without forming a structure like the bridge electrode across the gap 222. Therefore, the configuration according to the third example embodiment can simplify the structure as compared with the configurations according to the first and second embodiments.

When the through electrodes 240 are too long, that is, the substrate 204 is too thick, the above effect can be reduced. Therefore, in order to shorten the length of the through electrodes 240, it is desirable that the thickness of the substrate 204 is sufficiently thin. For example, it is desirable that the length of the through electrodes 240 is short enough with respect to a wavelength (operating wavelength) of a signal (a signal (high frequency signal; electromagnetic wave) used for realizing the operation of the oscillator 60) used for realizing the operation of the quantum bit. For example, the length of the through electrodes 240 is desirably 1/20 or less of the operating wavelength. In this case, in consideration of wavelength shortening depending on the effective dielectric constant in the path of the signal including the through electrodes 240, when the length is 1/20 or less of the operating wavelength, the phase difference of the instantaneous value becomes sufficiently small to be about 18 degrees or less, so that the effect of reducing the potential difference between the ground electrode 124 and the ground electrode 250 can be expected. Therefore, it can be said that the length of the through electrodes 240 is a sufficiently short distance to the extent that there is no problem in replacing the path constituted by the bumps 300, the bridge electrodes 400, and the ground electrodes 224 with the path constituted by the bumps 300, the through electrodes 240, and the ground electrode 250.

(Quantum Computer)

Figure 13:
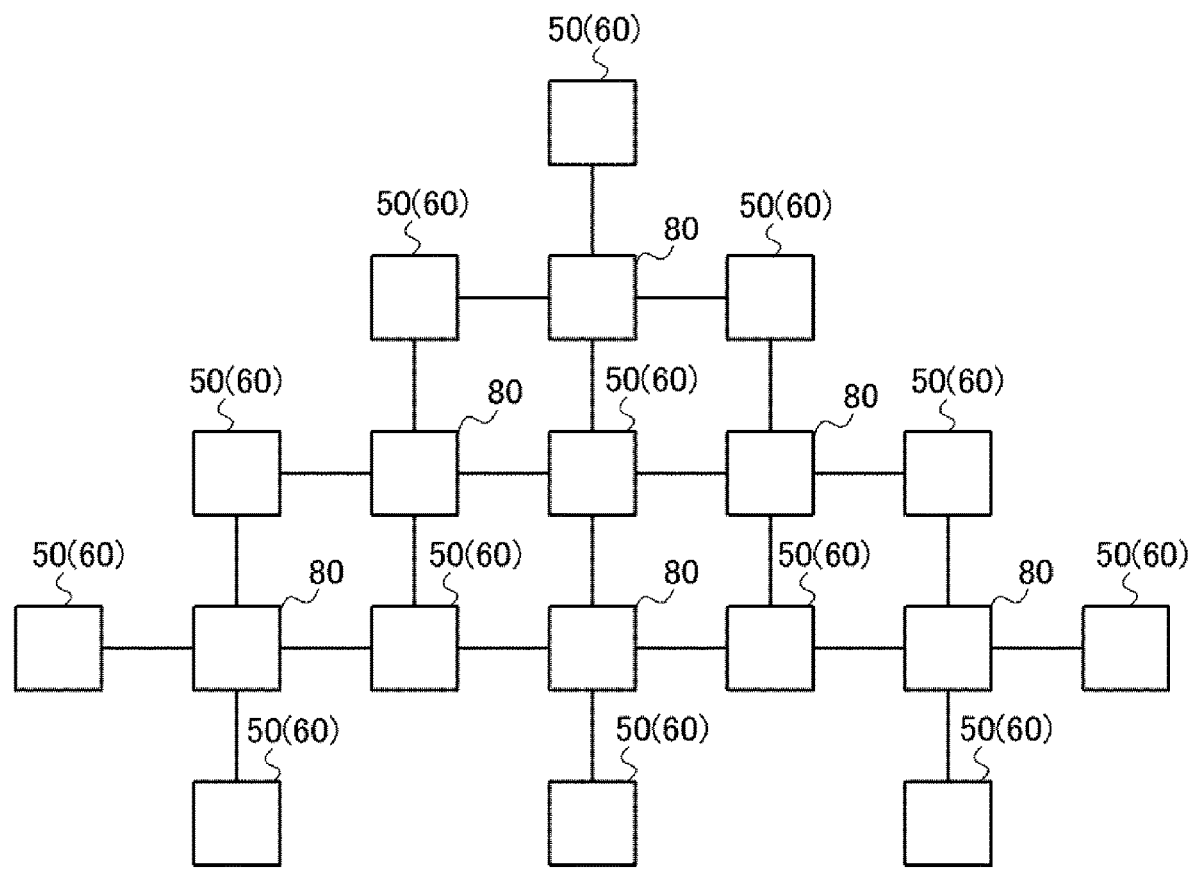
FIG. 13 is a diagram illustrating a configuration of a quantum computer including a plurality of quantum devices according to the example embodiments described above.

FIG. 13 is a diagram illustrating a configuration of a quantum computer 70 including the plurality of quantum devices 50 according to the above-described example embodiments. Note that the quantum computer 70 is, for example, a quantum annealing type computer that calculates a solution of any problem that can be mapped to the Ising model. When a magnetic field is applied by the SQUID 116, an oscillator 60 configured by the quantum device 50 performs parametric oscillation to realize a quantum bit (quantum bit circuit).

The quantum computer 70 includes the plurality of quantum devices 50 and at least one coupling circuit 80. The coupling circuit 80 is a circuit that couples a plurality of oscillators 60 (quantum bit, quantum bit circuit) configured by the plurality of quantum devices 50. In other words, the coupling circuit 80 is a circuit that couples the plurality of quantum devices 50. The quantum computer 70 is a computer in which a plurality of oscillators 60 configured by the plurality of quantum devices 50 forms a network via the coupling circuit 80. In other words, the quantum computer 70 is configured by arranging the plurality of quantum devices 50 in an array via the coupling circuit 80.

In the example of FIG. 13, the coupling circuit 80 couples four quantum devices 50 (oscillators 60). The coupling circuit 80 is coupled to the four oscillators 60. In addition, the coupling circuit 80 includes the couplers 122 described above. Furthermore, the couplers 122 described above are terminals of the coupling circuit 80 for coupling with the resonators 110 (oscillators 60). Therefore, the coupling circuit 80 couples the plurality of quantum bits configured by the plurality of quantum devices 50 and includes the couplers 122. Note that, in the example of FIG. 13, the coupling circuit 80 is connected to the four quantum devices 50 (oscillators 60), but the number of quantum devices 50 (oscillators 60) that can be coupled by one coupling circuit 80 can be appropriately set according to design conditions.

As described above, since the quantum device 50 according to the present example embodiment is configured as described above, it is possible to suppress the occurrence of the energy leakage mode in the coupler 122. Therefore, degradation in the performance of the quantum bit can be suppressed. Since the quantum computer 70 according to the present example embodiment includes such a quantum device 50, it is possible to improve the performance of the entire quantum bits.

(Modification)

Note that the present invention is not limited to the above example embodiments, and can be appropriately changed without departing from the gist. For example, in the above-described example embodiments, the couplers 122 are provided in the vicinity of all of the four end portions 112a to 112d of the conductive member 112. However, the coupler 122 does not need to be provided near all of the four end portions 112a to 112d of the conductive member 112. The couplers 122 can be appropriately arranged according to the arrangement of the quantum devices 50 (oscillators 60) in the quantum computer.

Furthermore, the resonator 110 according to the above-described example embodiments is configured such that the conductive member 112 has a cross shape, and the SQUID 116 is provided at the end portion of the cross shape. However, the configuration of the resonator 110 is not limited to such a configuration. The connection electrode 40 (the bridge electrodes 400 or the like) according to the present example embodiment is applicable regardless of the position of the SQUID 116 and the shape of the conductive member 112. Note that, in the following modifications, modifications to the first example embodiment are illustrated, but the same applies to other embodiments.

Figure 14:
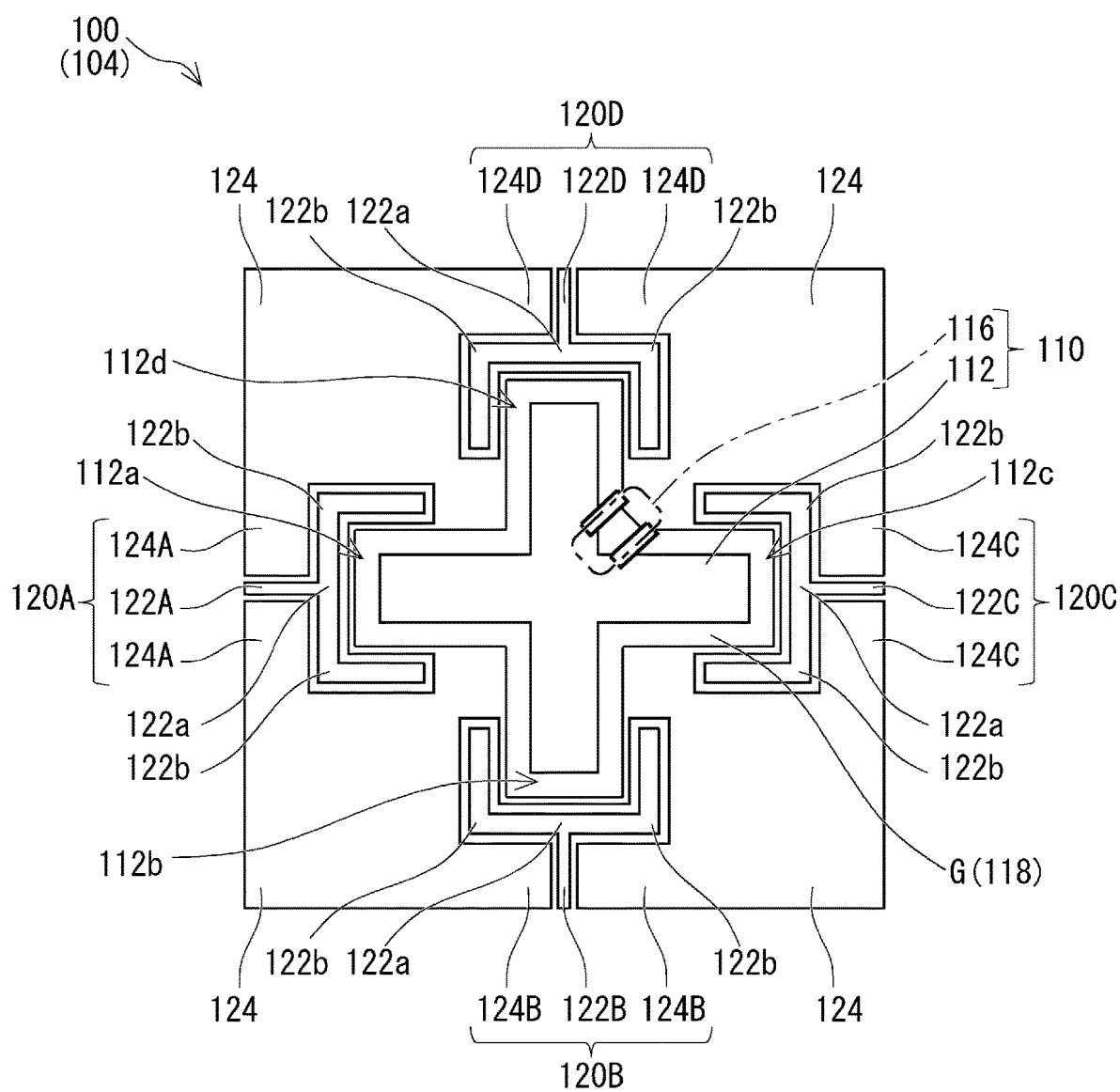
FIG. 14 is a plan view illustrating a configuration of a quantum chip according to a first modification.
Figure 15:
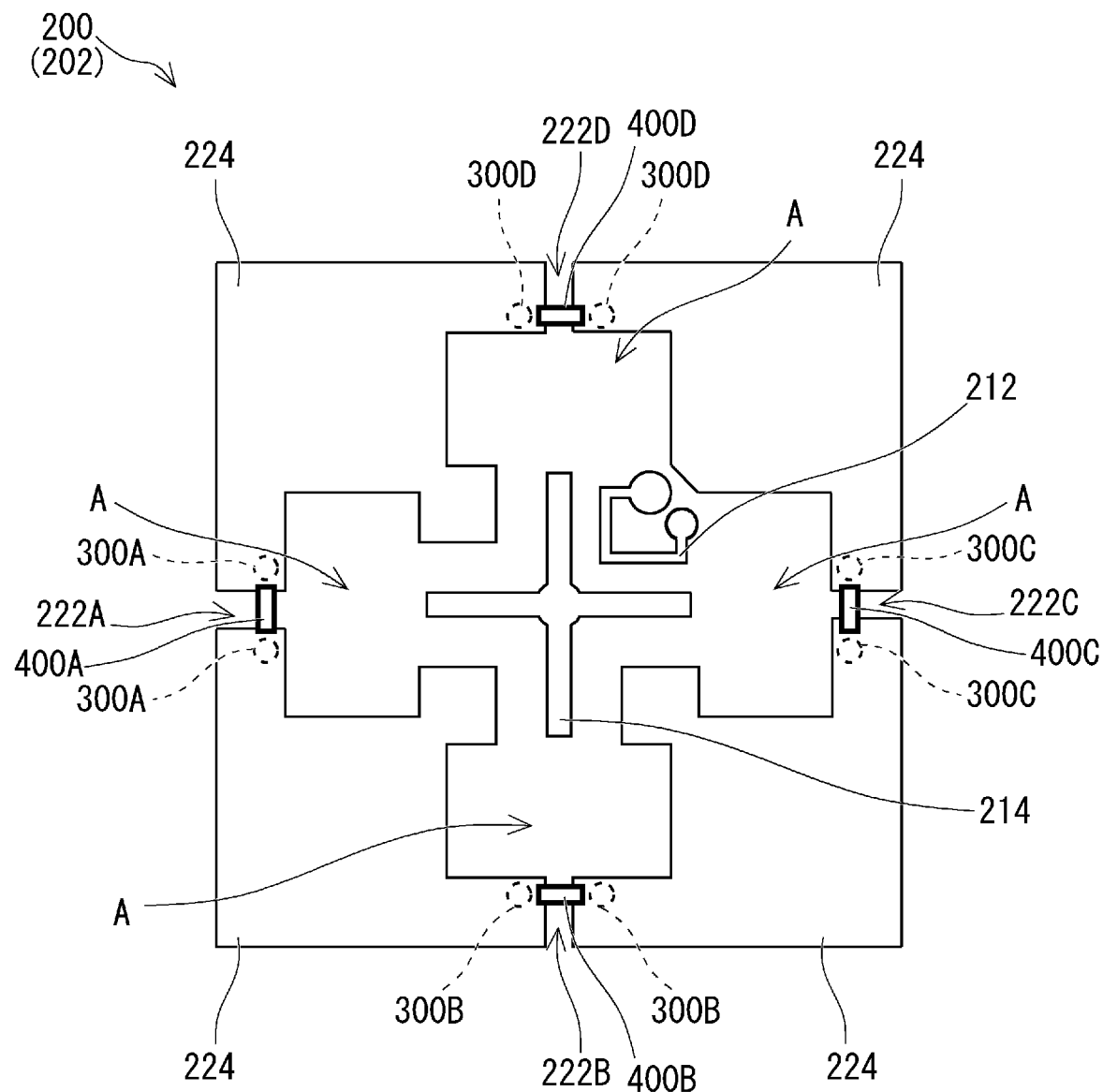
FIG. 15 is a plan view illustrating a configuration of an interposer according to the first modification.

FIG. 14 is a plan view illustrating a configuration of a quantum chip 100 (superconducting wiring layer 104) according to a first modification. FIG. 15 is a plan view illustrating a configuration of an interposer 200 (superconducting wiring layer 202) according to the first modification. In the first modification, the position of the SQUID 116 is different from those of the above-described example embodiments.

Specifically, as illustrated in FIG. 14, one end of the SQUID 116 is connected to a constricted portion of the cross-shaped conductive member 112, and the other end is connected to the ground electrode 124. The conductive member 112 and the SQUID 116 constitute the resonator 110.

In addition, as in the above-described example embodiment, four couplers 122 are arranged on four sides of the conductive member 112. Specifically, the couplers 122 (122A to 122D) are provided in the vicinity of the four respective end portions 112a to 112d of the conductive member 112. Similarly to the above-described example embodiments, the couplers 122 and the ground electrodes 124 around the couplers 122 form the coplanar lines 120.

In addition, since the position of the SQUID 116 is different from those of the above-described example embodiments, the position of the magnetic field application circuit 212, which applies a magnetic field to the SQUID 116, is also different from those of the above-described example embodiment. That is, as illustrated in FIG. 15, the magnetic field application circuit 212 is arranged at a position facing the SQUID 116 illustrated in FIG. 14 in the superconducting wiring layer 202. In addition, similarly to the above-described example embodiments, the cross-shaped reading unit 214 is arranged at a position facing the conductive member 112 in the superconducting wiring layer 202.

Also in the first modification, the gap 222 is formed at a position facing each coplanar line 120 of the superconducting wiring layer 202. The bridge electrode 400 is provided across each gap 222. The bumps 300 can be provided near the bridge electrodes 400. Therefore, the ground electrodes 124 on both sides of the coupler 122 are connected via the bumps 300, the ground electrodes 224, the bridge electrode 400, the ground electrodes 224, and the bumps 300. As a result, the potential difference between the ground electrodes 124 on both sides of the couplers 122 can be reduced. Therefore, also in the first modification, similarly to the above-described example embodiments, it is possible to suppress energy leakage between the ground electrodes 124 across the center conductor.

Figure 16:
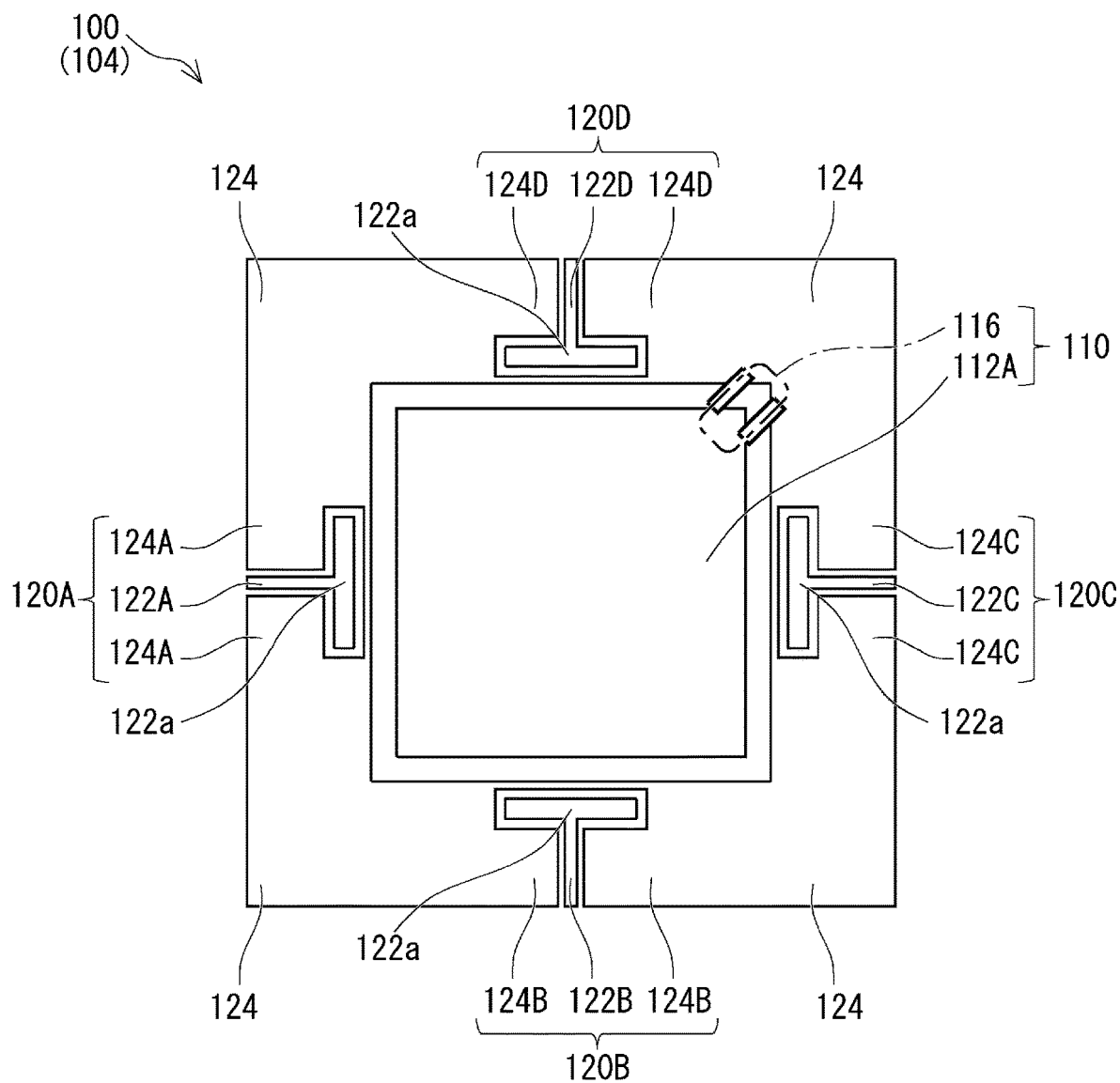
FIG. 16 is a plan view illustrating a configuration of a quantum chip according to a second modification.
Figure 17:
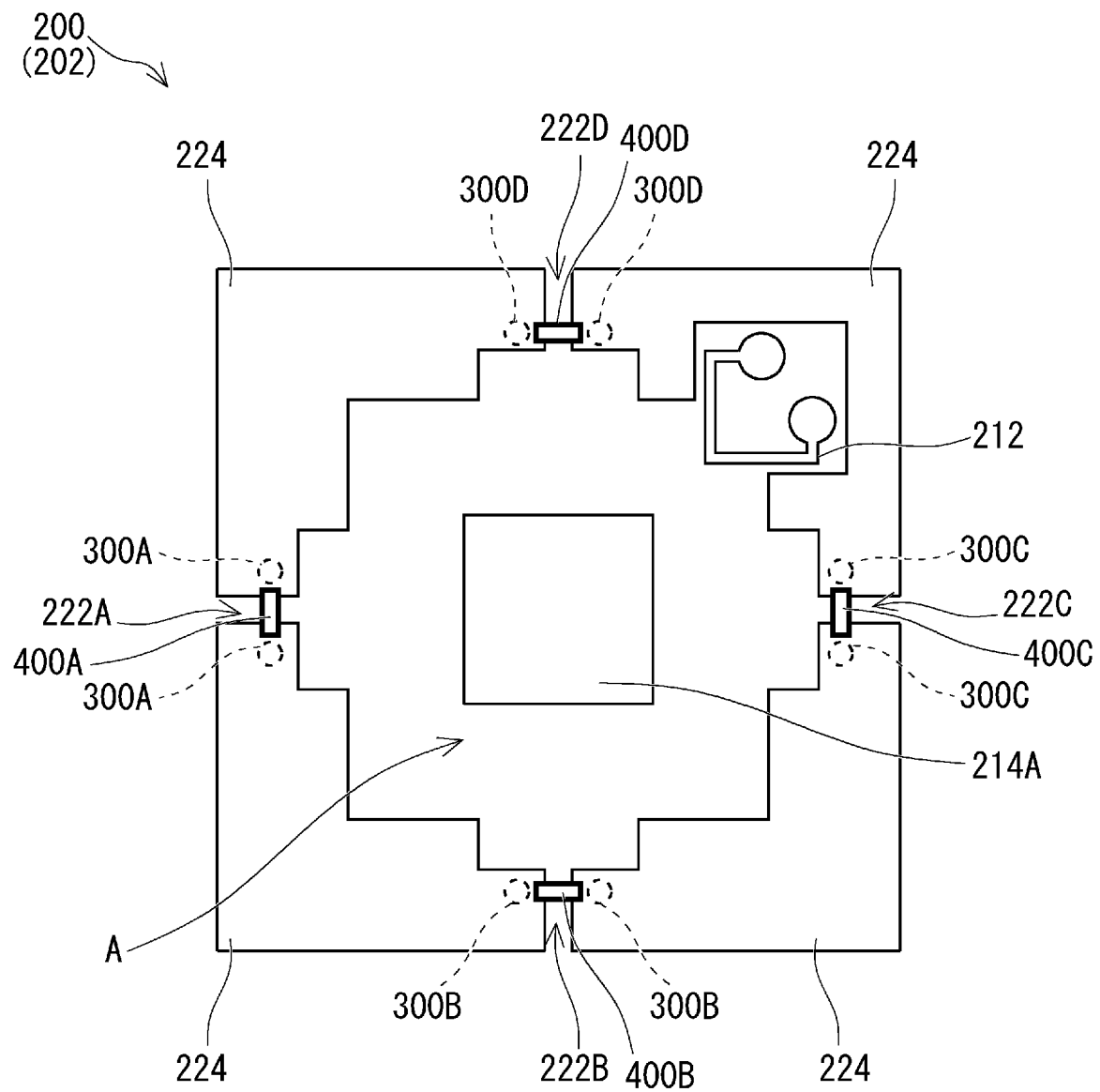
FIG. 17 is a plan view illustrating a configuration of an interposer according to the second modification.

FIG. 16 is a plan view illustrating a configuration of a quantum chip 100 (superconducting wiring layer 104) according to a second modification. FIG. 17 is a plan view illustrating a configuration of an interposer 200 (superconducting wiring layer 202) according to the second modification. In the second modification, the shape of the conductive member constituting the resonator 110 is different from those of the above-described example embodiments.

Specifically, as illustrated in FIG. 16, in the second modification, a quadrangular (for example, square) conductive member 112A is used instead of the cross-shaped conductive member 112. One end of the SQUID 116 is connected to one corner portion of the conductive member 112A, and the other end is connected to the ground electrode 124. The conductive member 112A and the SQUID 116 constitute the resonator 110.

Further, the four couplers 122 are arranged on four sides of the conductive member 112A. Specifically, the coupler 122 (122A to 122D) is provided around each of the four sides of the conductive member 112A. Similarly to the above-described example embodiments, the couplers 122 and the ground electrodes 124 around the couplers 122 form the coplanar lines 120.

In addition, since the position of the SQUID 116 is different from those of the above-described example embodiments, the position of the magnetic field application circuit 212, which applies a magnetic field to the SQUID 116, is also different from those of the above-described example embodiment. That is, as illustrated in FIG. 17, the magnetic field application circuit 212 is arranged at a position facing the SQUID 116 illustrated in FIG. 16 in the superconducting wiring layer 202. In addition, a quadrangular (for example, square) reading unit 214A is arranged at a position of the superconducting wiring layer 202 facing the conductive member 112A.

Also in the second modification, the gap 222 is formed at a position facing each coplanar line 120 of the superconducting wiring layer 202. The bridge electrode 400 is provided across each gap 222. The bumps 300 can be provided near the bridge electrodes 400. Therefore, the ground electrodes 124 on both sides of the coupler 122 are connected via the bumps 300, the ground electrodes 224, the bridge electrode 400, the ground electrodes 224, and the bumps 300. As a result, the potential difference between the ground electrodes 124 on both sides of the couplers 122 can be reduced. Therefore, also in the second modification, similarly to the above-described example embodiment, it is possible to suppress energy leakage between the ground electrodes 124 across the center conductor.

Figure 18:
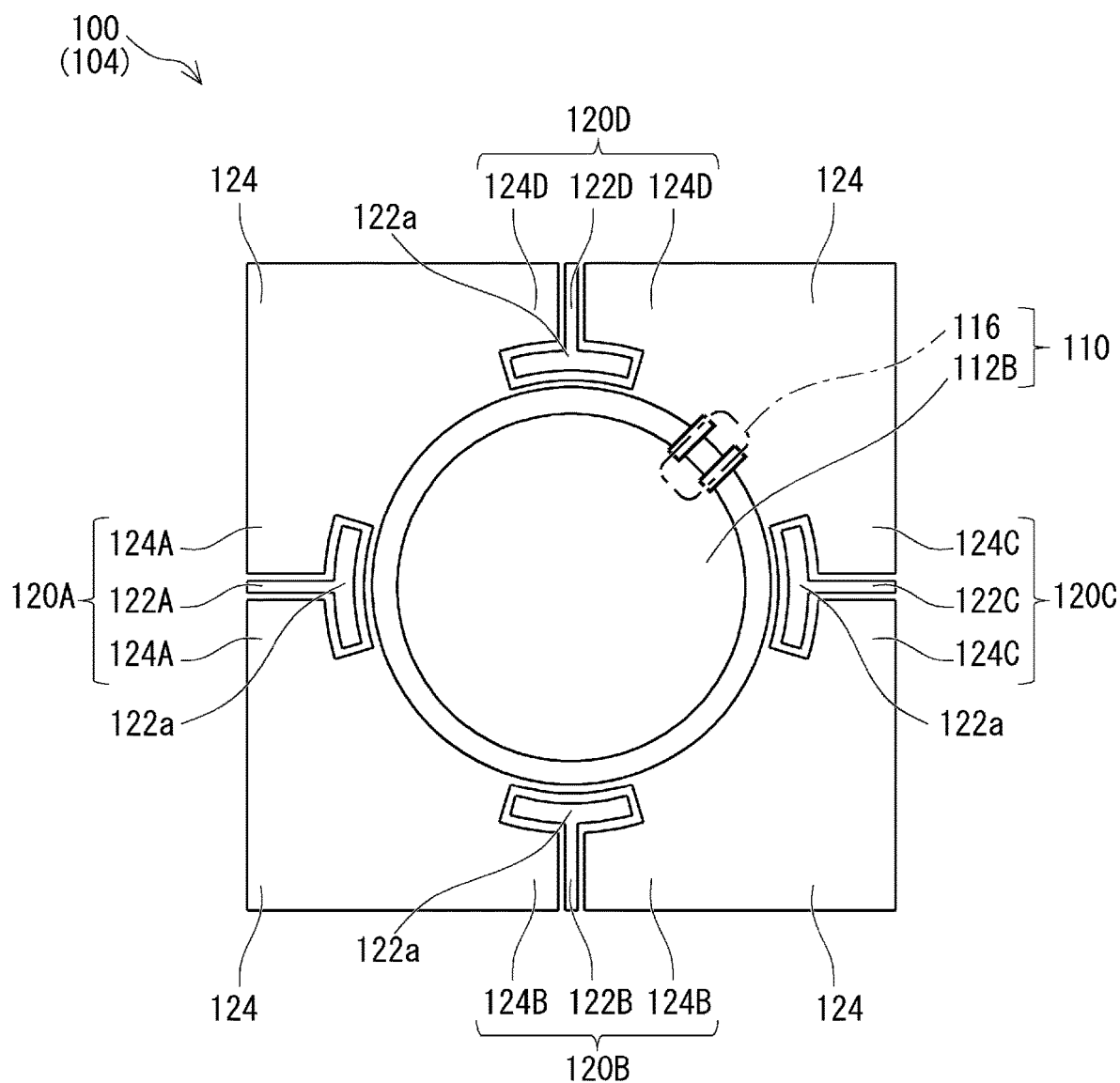
FIG. 18 is a plan view illustrating a configuration of a quantum chip according to a third modification.
Figure 19:
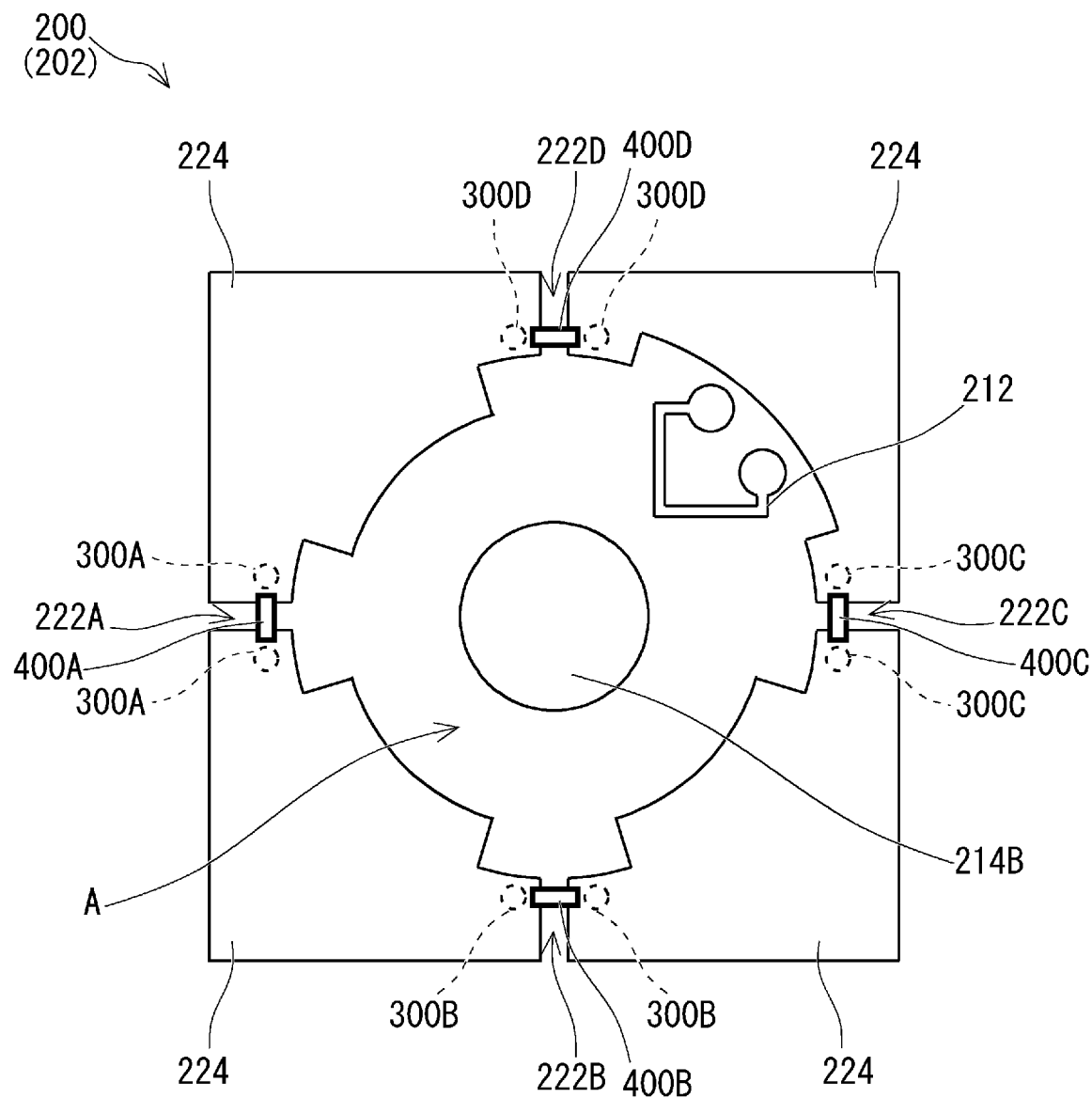
FIG. 19 is a plan view illustrating a configuration of an interposer according to the third modification.

FIG. 18 is a plan view illustrating a configuration of a quantum chip 100 (superconducting wiring layer 104) according to a third modification. FIG. 19 is a plan view illustrating a configuration of an interposer 200 (superconducting wiring layer 202) according to the third modification. In the third modification, the shape of the conductive member constituting the resonator 110 is different from those of the above-described example embodiments.

Specifically, as illustrated in FIG. 18, in the third modification, a circular conductive member 112B is used instead of the cross-shaped conductive member 112. One end of the SQUID 116 is connected to the conductive member 112B, and the other end is connected to the ground electrode 124. The conductive member 112B and the SQUID 116 constitute the resonator 110.

In addition, four couplers 122 are arranged on four sides of the conductive member 112B. Specifically, a coupler 122 (122A to 122D) is provided in the vicinity of each of the four sides of the conductive member 112B. Similarly to the above-described example embodiments, the couplers 122 and the ground electrodes 124 around the couplers 122 form the coplanar lines 120.

In addition, since the position of the SQUID 116 is different from those of the above-described example embodiments, the position of the magnetic field application circuit 212, which applies a magnetic field to the SQUID 116, is also different from those of the above-described example embodiment. That is, as illustrated in FIG. 19, the magnetic field application circuit 212 is arranged at a position facing the SQUID 116 illustrated in FIG. 18 in the superconducting wiring layer 202. In addition, a circular reading unit 214B is arranged at a position facing the conductive member 112B in the superconducting wiring layer 202.

Also in the third modification, the gap 222 is formed at a position facing each coplanar line 120 of the superconducting wiring layer 202. The bridge electrode 400 is provided across each gap 222. The bumps 300 can be provided near the bridge electrodes 400. Therefore, the ground electrodes 124 on both sides of the coupler 122 are connected via the bumps 300, the ground electrodes 224, the bridge electrode 400, the ground electrodes 224, and the bumps 300. As a result, the potential difference between the ground electrodes 124 on both sides of the couplers 122 can be reduced. Therefore, also in the third modification, similarly to the above-described example embodiments, it is possible to suppress energy leakage between the ground electrodes 124 across the center conductor.

Although the invention of the present application has been described above with reference to the example embodiments, the invention of the present application is not limited to the above. Various modifications that can be understood by those skilled in the art can be made to the configuration and details of the present invention within the scope of the invention.

Some or all of the above example embodiments may be described as the following supplementary notes, but are not limited to the following.

Supplementary Note 1

A quantum device including:
a quantum chip constituting a quantum bit; and
an interposer facing the quantum chip and having a conductor formed on at least a surface facing the quantum chip, wherein
the quantum chip is flip-chip mounted on the interposer by a bump,
a coplanar line for coupling adjacent quantum bits is formed in the quantum chip, and the coplanar line includes a center conductor and a first ground electrode around the center conductor,
in a surface of the interposer facing the quantum chip, the conductor is not partially formed along a path of the coplanar line at a location facing the center conductor of the coplanar line, and a second ground electrode is formed around a gap in which the conductor is not formed,
the interposer includes a connection electrode configured to connect the second ground electrode around the gap, and
the bump formed in the vicinity of the connection electrode is connected to the first ground electrode and the second ground electrode.

Supplementary Note 2

The quantum device according to Supplementary Note 1, wherein
the quantum chip is provided with a resonator, and
the connection electrode is formed at a position not facing the resonator of the interposer.

Supplementary Note 3

The quantum device according to Supplementary Note 2, wherein
the resonator includes a conductive member having a predetermined shape, and
the center conductor is provided in the vicinity of the conductive member.

Supplementary Note 4

The quantum device according to any one of Supplementary Notes 1 to 3, wherein
the connection electrode includes a first bridge electrode having a bridge shape and formed so as to extend over a part of the gap, and
the bump formed in the vicinity of the first bridge electrode is connected to the first ground electrode and the second ground electrode.

Supplementary Note 5

The quantum device according to Supplementary Note 4, wherein
the center conductor has a discontinuous shape, and
the first bridge electrode is provided at a location corresponding to the discontinuous shape in the gap.

Supplementary Note 6

The quantum device according to Supplementary Note 4 or 5, wherein the first bridge electrode is formed on the same plane as the second ground electrode around the gap.

Supplementary Note 7

The quantum device according to any one of Supplementary Notes 1 to 6, wherein the quantum chip is provided with a resonator,
the resonator includes a superconducting quantum interference device (SQUID),
the center conductor is provided in the vicinity of the SQUID,
the interposer is provided with a magnetic field application circuit configured to apply a magnetic field to the SQUID, a gap is provided between a third ground electrode and the second ground electrode of the magnetic field application circuit at a position facing the center conductor in the vicinity of the SQUID, the interposer includes a second bridge electrode having a bridge shape and formed so as to extend over a part of the gap, and the third ground electrode and the second ground electrode are partially connected by the second bridge electrode.

Supplementary Note 8

The quantum device according to Supplementary Note 7, wherein one end of the second bridge electrode is located in the vicinity of the bump connected to the first ground electrode and the third ground electrode, and another end of the second bridge electrode is located in the vicinity of the bump connected to the first ground electrode and the second ground electrode.

Supplementary Note 9

The quantum device according to Supplementary Note 1, wherein the interposer has an outer frame structure of a conductor formed so as to surround a superconducting wiring layer facing the quantum chip of the interposer and formed integrally with the second ground electrode, and an outer frame portion of the outer frame structure provided at a position corresponding to the gap functions as the connection electrode.

Supplementary Note 10

The quantum device according to Supplementary Note 1, wherein a fourth ground electrode is formed on a surface of the interposer opposite to a surface facing the quantum bit, a through electrode is provided between the second ground electrode and the fourth ground electrode, the through electrode connecting the second ground electrode and the fourth ground electrode and penetrating a substrate of the interposer, and the connection electrode includes the through electrode in the vicinity of the gap and the fourth ground electrode.

Supplementary Note 11

The quantum device according to Supplementary Note 10, wherein a length of the through electrode is equal to or less than a predetermined value regarding a wavelength of a signal that operates to realize the quantum bit.

Supplementary Note 12

The quantum device according to Supplementary Note 11, wherein the length of the through electrode is $1/20$ or less of the wavelength.

Supplementary Note 13

The quantum device according to any one of Supplementary Notes 1 to 12, wherein a plurality of the bumps is arranged in a lattice pattern or randomly between the first ground electrode and the second ground electrode.

Supplementary Note 14

A quantum computer including:

a plurality of the quantum devices according to any one of Appendixes 1 to 13; and at least one coupling circuit configured to couple the plurality of quantum bits configured by the plurality of quantum devices and including a coupler configured by the center conductor.

Supplementary Note 15

A quantum device including:

a quantum chip constituting a quantum bit; and an interposer provided to face the quantum chip, wherein the quantum chip is flip-chip mounted on the interposer by a bump, a coplanar line for coupling adjacent quantum bits is formed in the quantum chip, and the coplanar line includes a center conductor and a first ground electrode around the center conductor, a second ground electrode is formed in the interposer in a region facing the first ground electrode, the interposer includes a connection electrode connected to the second ground electrode, the bump formed in the vicinity of the connection electrode is connected to the first ground electrode and the second ground electrode, and at least a part of the connection electrode faces the center conductor via a space.

REFERENCE SIGNS LIST

1 QUANTUM DEVICE
10 QUANTUM CHIP
12 COPLANAR LINE
12$a$ CENTER CONDUCTOR
12$b$ FIRST GROUND ELECTRODE
20 INTERPOSER
22 GAP
24 SECOND GROUND ELECTRODE
30 BUMP
40 CONNECTION ELECTRODE
50 QUANTUM DEVICE
60 OSCILLATOR
70 QUANTUM COMPUTER
80 COUPLING CIRCUIT
100 QUANTUM CHIP
102 SUBSTRATE
104 SUPERCONDUCTING WIRING LAYER
110 RESONATOR
112 CONDUCTIVE MEMBER
114 JOSEPHSON JUNCTION
118 CAPACITOR
120 COPLANAR LINE
122 COUPLER
122$a$ BRANCH PORTION
122$b$ BENT PORTION
124 GROUND ELECTRODE
200 INTERPOSER
202 SUPERCONDUCTING WIRING LAYER
204 SUBSTRATE
206 SUPERCONDUCTING WIRING LAYER
212 MAGNETIC FIELD APPLICATION CIRCUIT
214 READING UNIT
222 GAP
224 GROUND ELECTRODE
240 THROUGH ELECTRODE
250 GROUND ELECTRODE
300 BUMP

400 BRIDGE ELECTRODE
420 OUTER FRAME STRUCTURE
422 OUTER FRAME PORTION
440 CONNECTION ELECTRODE

What is claimed is:

1. A quantum device comprising:
   a quantum chip constituting a quantum bit; and
   an interposer facing the quantum chip and having a conductor formed on at least a surface facing the quantum chip, wherein
   the quantum chip is flip-chip mounted on the interposer by a bump,
   in the quantum chip, a coplanar line for coupling adjacent quantum bits is formed, and the coplanar line includes a center conductor and a first ground electrode around the center conductor,
   in a surface of the interposer facing the quantum chip, the conductor is not partially formed along a path of the coplanar line at a location facing the center conductor of the coplanar line, and a second ground electrode is formed around a gap in which the conductor is not formed,
   the interposer includes a connection electrode configured to connect the second ground electrode around the gap, and
   the bump formed in the vicinity of the connection electrode is connected to the first ground electrode and the second ground electrode.

2. The quantum device according to claim 1, wherein
   the quantum chip is provided with a resonator, and
   the connection electrode is formed at a position not facing the resonator of the interposer.

3. The quantum device according to claim 2, wherein
   the resonator includes a conductive member having a predetermined shape, and
   the center conductor is provided in the vicinity of the conductive member.

4. The quantum device according to claim 1, wherein
   the connection electrode includes a first bridge electrode having a bridge shape and formed so as to extend over a part of the gap, and
   the bump formed in the vicinity of the first bridge electrode is connected to the first ground electrode and the second ground electrode.

5. The quantum device according to claim 4, wherein
   the center conductor has a discontinuous shape, and
   the first bridge electrode is provided at a location corresponding to the discontinuous shape in the gap.

6. The quantum device according to claim 4, wherein the first bridge electrode is formed on the same plane as the second ground electrode around the gap.

7. The quantum device according to claim 1, wherein
   the quantum chip is provided with a resonator,
   the resonator includes a superconducting quantum interference device (SQUID),
   the center conductor is provided in the vicinity of the SQUID,
   the interposer is provided with a magnetic field application circuit configured to apply a magnetic field to the SQUID,
   a gap is provided between a third ground electrode and the second ground electrode of the magnetic field application circuit at a position facing the center conductor in the vicinity of the SQUID,
   the interposer includes a second bridge electrode having a bridge shape and formed so as to extend over a part of the gap, and
   the third ground electrode and the second ground electrode are partially connected by the second bridge electrode.

8. The quantum device according to claim 7, wherein one end of the second bridge electrode is located in the vicinity of the bump connected to the first ground electrode and the third ground electrode, and another end of the second bridge electrode is located in the vicinity of the bump connected to the first ground electrode and the second ground electrode.

9. The quantum device according to claim 1, wherein
   the interposer has an outer frame structure of a conductor formed so as to surround a superconducting wiring layer facing the quantum chip of the interposer and formed integrally with the second ground electrode, and
   an outer frame portion of the outer frame structure provided at a position corresponding to the gap functions as the connection electrode.

10. The quantum device according to claim 1, wherein
    a fourth ground electrode is formed on a surface of the interposer opposite to a surface facing the quantum bit,
    a through electrode is provided between the second ground electrode and the fourth ground electrode, the through electrode connecting the second ground electrode and the fourth ground electrode and penetrating a substrate of the interposer, and
    the connection electrode includes the through electrode in the vicinity of the gap and the fourth ground electrode.

11. The quatum device according to claim 10, wherein a length of the through electrode is equal to or less than a predetermined value regarding a wavelength of a signal that operates to realize the quantum bit.

12. The quantum device according to claim 11, wherein the length of the through electrode is ¹⁄₂₀ or less of the wavelength.

13. The quantum device according to claim 1, wherein a plurality of the bumps is arranged in a lattice pattern or randomly between the first ground electrode and the second ground electrode.

14. A quantum computer comprising:
    a plurality of the quantum devices according to claim 1; and
    at least one coupling circuit configured to couple the plurality of quantum bits configured by the plurality of quantum devices and including a coupler configured by the center conductor.

15. A quantum device comprising:
    a quantum chip constituting a quantum bit; and
    an interposer provided to face the quantum chip, wherein
    the quantum chip is flip-chip mounted on the interposer by a bump,
    in the quantum chip, a coplanar line for coupling adjacent quantum bits is formed, and the coplanar line includes a center conductor and a first ground electrode around the center conductor,
    a second ground electrode is formed in the interposer in a region facing the first ground electrode,
    the interposer includes a connection electrode connected to the second ground electrode,
    the bump formed in the vicinity of the connection electrode is connected to the first ground electrode and the second ground electrode, and
    at least a part of the connection electrode faces the center conductor via a space.

* * * * *